(12) United States Patent
Oida et al.

(10) Patent No.: US 6,356,365 B1
(45) Date of Patent: Mar. 12, 2002

(54) IMAGE READING DEVICE AND IMAGE READING METHOD

(75) Inventors: Jun Oida, Kawasaki; Naohisa Suzuki, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/156,928

(22) Filed: Sep. 18, 1998

(30) Foreign Application Priority Data

Sep. 22, 1997 (JP) ................................................ 9-273269

(51) Int. Cl.$^7$ .................................................. H04N 1/04
(52) U.S. Cl. ...................... 358/475; 250/208.1; 315/307
(58) Field of Search ................................. 358/475, 497, 358/474, 461, 500, 505, 516; 315/307, 355; 250/561, 208.1

(56) References Cited

U.S. PATENT DOCUMENTS 4,961,117 A * 10/1990 Rumley ....................... 358/461
5,202,556 A * 4/1993 Kawabata ................ 250/208.1

* cited by examiner

Primary Examiner—Jerome Grant, II
Assistant Examiner—Negussie Worku
(74) Attorney, Agent, or Firm—Robin, Blecker & Daley

(57) ABSTRACT

An image reading method and device are capable of producing a sufficient amount of light to read an original image by means of a simplified circuit construction, and are also capable of providing more stable high-quality image information with less power consumption. The image reading device includes a reduced optical system which is arranged to bring reflected light obtained by illuminating an original with an LED into focus on a CCD sensor through a lens and read an image formed on the CCD, and also includes a custom IC for performing preheating control and warmth retention control of the LED.

25 Claims, 33 Drawing Sheets

F I G. 16

COLOR MODE

| RESOLUTION | STORAGE TIME | FORWARD MOVEMENT TIME msec | REVERSE MOVEMENT TIME msec | MOVEMENT TIME PER LINE msec | DOT WIDTH | NUMBER OF TIMES | TIME FOR A4 msec |
|---|---|---|---|---|---|---|---|
| 360 * 360 dpi φTR = 0 COLOR | 256μ sec | 3.9 K 863.4 | 3.9 K 863.4 | 1726.8 | 64 | 66 | 341906.4 5 min 42 sec |
| 180 * 180 dpi φTR = 0 COLOR | 320μ sec | 6.25 K 545.4 | 6.25 K 545.4 | 1090.8 | 64 | 66 | 215978.4 3 min 36 sec |
| 90 * 90 dpi φTR = 0 COLOR | 307μ sec | 6.51 K 523.6 | 6.51 K 523.6 | 1047.2 | 64 | 66 | 207345.6 3 min 27 sec |
| 200 * 360 dpi φTR = 0 COLOR | 288μ sec | 6.25 K 545.4 | 6.25 K 545.4 | 1090.8 | 64 | 66 | 215978.4 3 min 36 sec |
| 300 * 360 dpi φTR = 0 COLOR | 307μ sec | 3.9 K 863.4 | 3.9 K 863.4 | 1726.8 | 64 | 66 | 341906.4 5 min 42 sec |

SHEET FEEDING TIME : 5 sec
SHEET DISCHARGING TIME : 1 sec

FIG. 17

MONOCHROME MULTILEVEL MODE (IMAGE TRUST MODE)

| RESOLUTION | STORAGE TIME | FORWARD MOVEMENT TIME msec | REVERSE MOVEMENT TIME msec | MOVEMENT TIME PER LINE msec | DOT WIDTH | NUMBER OF TIMES | TIME FOR A4 msec |
|---|---|---|---|---|---|---|---|
| 360 * 360 dpi φTR = 0 MONO | 256 μ sec | 3.9 K 863.4 | 3.9 K 863.4 | 1726.8 | 64 | 66 | 113968.8 1 min 54 sec |
| 180 * 180 dpi φTR = 0 MONO | 320 μ sec | 6.25 K 545.4 | 6.25 K 545.4 | 1090.8 | 64 | 66 | 71992.8 1 min 12 sec |
| 90 * 90 dpi φTR = 0 MONO | 307 μ sec | 6.51 K 523.6 | 6.51 K 523.6 | 1047.2 | 64 | 66 | 69115.2 1 min 09 sec |
| 200 * 360 dpi φTR = 0 MONO | 288 μ sec | 6.25 K 545.4 | 6.25 K 545.4 | 1090.8 | 64 | 66 | 71992.8 1 min 12 sec |
| 300 * 360 dpi φTR = 0 MONO | 307 μ sec | 3.9 K 863.4 | 3.9 K 863.4 | 1726.8 | 64 | 66 | 113968.8 1 min 54 sec |

SHEET FEEDING TIME : 5 sec
SHEET DISCHARGING TIME : 1 sec

FIG. 18

MONOCHROME BILEVEL MODE

| RESOLUTION | STORAGE TIME | FORWARD MOVEMENT TIME msec | REVERSE MOVEMENT TIME msec | MOVEMENT TIME PER LINE msec | DOT WIDTH | NUMBER OF TIMES | TIME FOR A4 msec |
|---|---|---|---|---|---|---|---|
| 360 * 360 dpi φTR = 0 MONO | 256 μ sec | 3.9 K | 3.9 K | 1726.8 | 64 | 66 | 113968.8 1 min 54 sec |
| 180 * 180 dpi φTR = 0 MONO | 320 μ sec | 863.4 | 863.4 | 1090.8 | 64 | 66 | 71992.8 1 min 12 sec |
| 90 * 90 dpi φTR = 0 MONO | 307 μ sec | 6.25 K | 6.25 K | 1047.2 | 64 | 66 | 69115.2 1 min 09 sec |
| 200 * 360 dpi φTR = 0 MONO | 288 μ sec | 6.51 K | 6.51 K | 1090.8 | 64 | 66 | 71992.8 1 min 12 sec |
| 300 * 360 dpi φTR = 0 MONO | 307 μ sec | 545.4 | 545.4 | 1726.8 | 64 | 66 | 113968.8 1 min 54 sec |

SHEET FEEDING TIME : 5 sec
SHEET DISCHARGING TIME : 1 sec

TIMING CHART OF WHITE REFERENCE VALUE DETECTING PROCESS

IMAGE READING DEVICE AND IMAGE READING METHOD

BACKGROUND OF THE INVENTION

1. Field of the Invention

The present invention relates to an image reading method and device for use in an image scanner or a facsimile machine.

2. Description of Related Art

It is known that general image reading devices which are used in image scanners, facsimile machines or the like employ reduced optical systems of the type shown in FIG. 33. Such an image reading device includes a longitudinally elongated light source 3102 which illuminates an original 3101, a mirror 3103 which bends an optical path for reducing the size of the entire device, a lens 3104 which focuses light information from the original 3101, a white reference correction plate (shading correction plate) 3105 which corrects a degradation due to a cosine fourth law of the white output waveform of the lens 3104, and a CCD (image pickup element) 3106 which converts the light information focused by the lens 3104 into an electrical signal. An image signal which is outputted from the CCD 3106 is A/D converted by an A/D (analog/digital) converter, and is subjected to image processing.

In some types of image reading devices having an arrangement similar to the above-described one, an LED (light-emitting diode) is used as a light source for illuminating an original.

However, since the absolute amount of light per LED is small, there is the problem that if stable image information is to be obtained, it is necessary to extend the storage time required for image reading or to increase the sensitivity of a reception system.

However, at present, although research and development for increasing the driving speed of a BASIS sensor (base-stored image sensor) or a CCD device which serves as a light-receiving element has been promoted, the sensitivity characteristics of a light-receiving part for photoelectrically converting light information of an original are limited, and if an S/N (signal/noise) ratio is to be improved, it is necessary to illuminate the original with a sufficient amount of light.

If driving current which flows through the LED and the like is increased to increase the amount of light, there is the problem that a variation of the current due to a variation in the wavelength of light and a variation in forward voltage occurs as the result of the generation of heat in the LED itself and a stable amount of light cannot be obtained.

Two methods for solving this problem have heretofore been known. One method called preheating is to quickly heat a light source up to a predetermined temperature in advance, while the other method called warmth retention is to hold a predetermined constant state even while scanning is not being performed. These methods are capable of eliminating a thermally unstable state of the light source immediately after a power supply is turned on, and a thermally unstable factor immediately after a scan is started after a long interrupt.

However, if colors are to be read by sequentially switching LEDs for three different colors R, G and B, particularly if the amount of current which flows through each of the color LEDs greatly varies during each color scanning, heat equilibrium which contains the self heating of the LEDs themselves is impaired, and heat is gradually accumulated in the LEDs and an unbalance occurs between the start and the end of scanning of an original. As a result, an influence such as a subtle variation in color or contrast is exerted on an image.

BRIEF SUMMARY OF THE INVENTION

An object of the present invention is to provide an image reading device capable of obtaining stable high-quality image information as well as a method of controlling the same.

To achieve the above object, in accordance with one aspect of the present invention, there is provided an image reading device which reads an original image illuminated by a light source, by using a light-receiving element, the image reading device comprising control means for controlling energy consumption of the light source so that energy which is consumed by the light source in the process of obtaining reference data which serves as a reference for correcting an image signal outputted from the light-receiving element is made approximately the same as energy which is consumed by light source in the process of obtaining no reference data.

In accordance with another embodiment of the present invention, there is provided a method of controlling an image reading device which reads an original image illuminated by a light source, by using a light-receiving element, the method comprising a step of controlling energy consumption of the light source so that energy which is consumed by the light source in the process of obtaining reference data which serves as a reference for correcting an image signal outputted from the light-receiving element is made approximately the same as energy which is consumed by the light source in the process of obtaining no reference data.

According to the above-described arrangement and construction, it is possible to obtain accurate reference data and hence stable high-quality image information.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 16 is a table showing the contents of an image reading mode in the color scanner unit;

FIG. 17 is a table showing the contents of an image reading mode in the color scanner unit;

FIG. 18 is a table showing the contents of an image reading mode in the color scanner unit;

DETAILED DESCRIPTION OF THE INVENTION

Preferred embodiments of the present invention will be described below in detail with reference to the accompanying drawings.

(First Embodiment)

Figure 1:
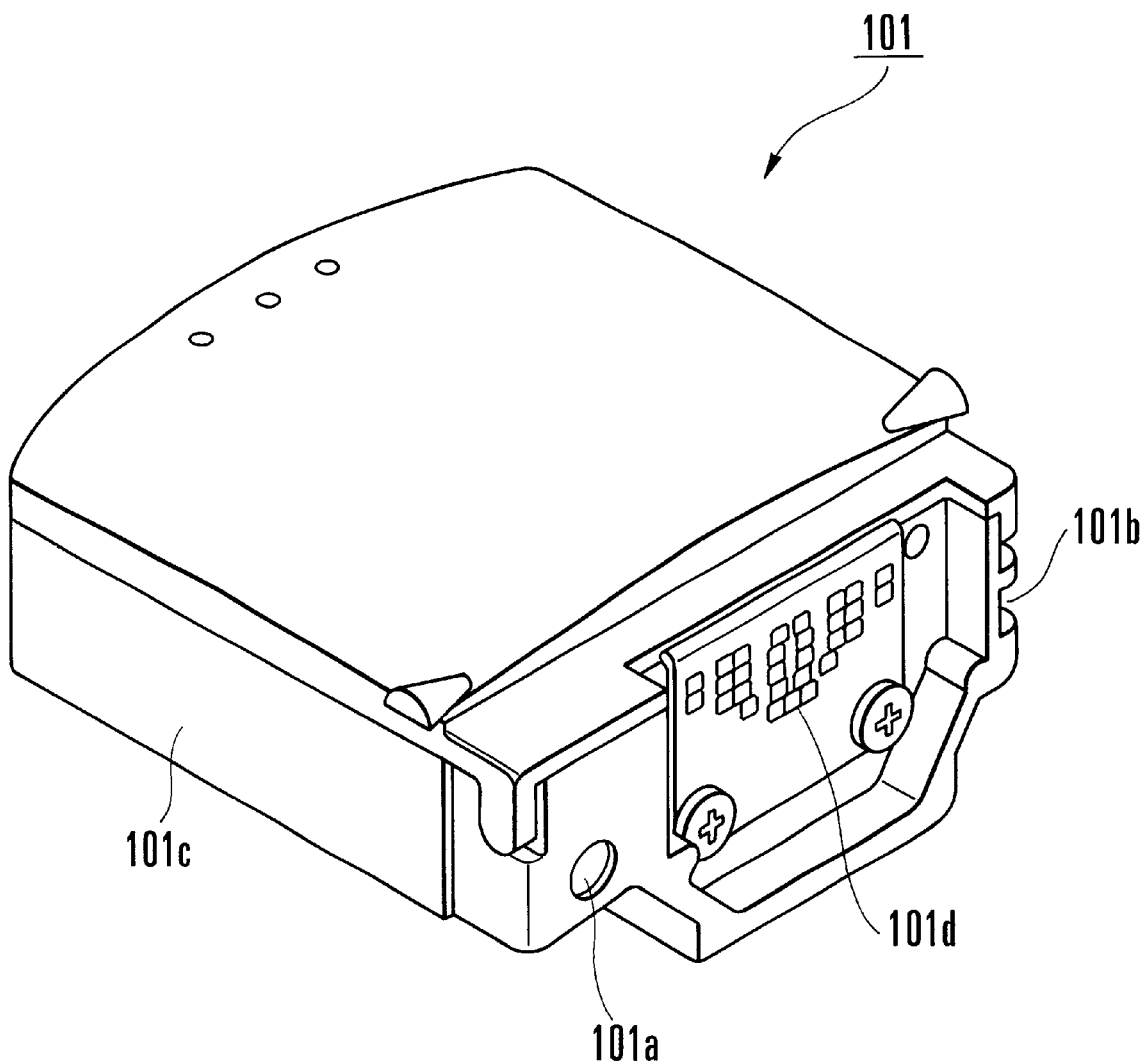
FIG. 1 is a diagrammatic perspective view showing the external appearance of a color scanner unit which is an image reading device according to a first embodiment of the present invention.

A first embodiment of the present invention will be described below with reference to FIGS. 1 to 28. FIG. 1 is a diagrammatic perspective view showing the external appearance of a color scanner unit which is an image reading device according to a first embodiment of the present invention. Referring to FIG. 1, a body 101 has a positioning hole 101a and a positioning groove 101b which serve to position the body 101 by being brought into engagement with projecting portions (not shown) of a carriage of a printer unit (not shown) when the body 101 is mounted on the carriage. One side wall of the body 101 constitutes a reference wall 101c for determining the attitude of the body 101 in the reading direction of the color scanner unit, and the mounting position of the body 101 is determined by the reference wall 101c being pressed against a reference wall (not shown) of the carriage. One end face of the body 101 is provided with a connector portion 101d which serves as an internal I/F (interface) which is electrically connected to the printer unit for transmission or reception of signals to or from the same when the body 101 is mounted on the printer unit.

Figure 2:
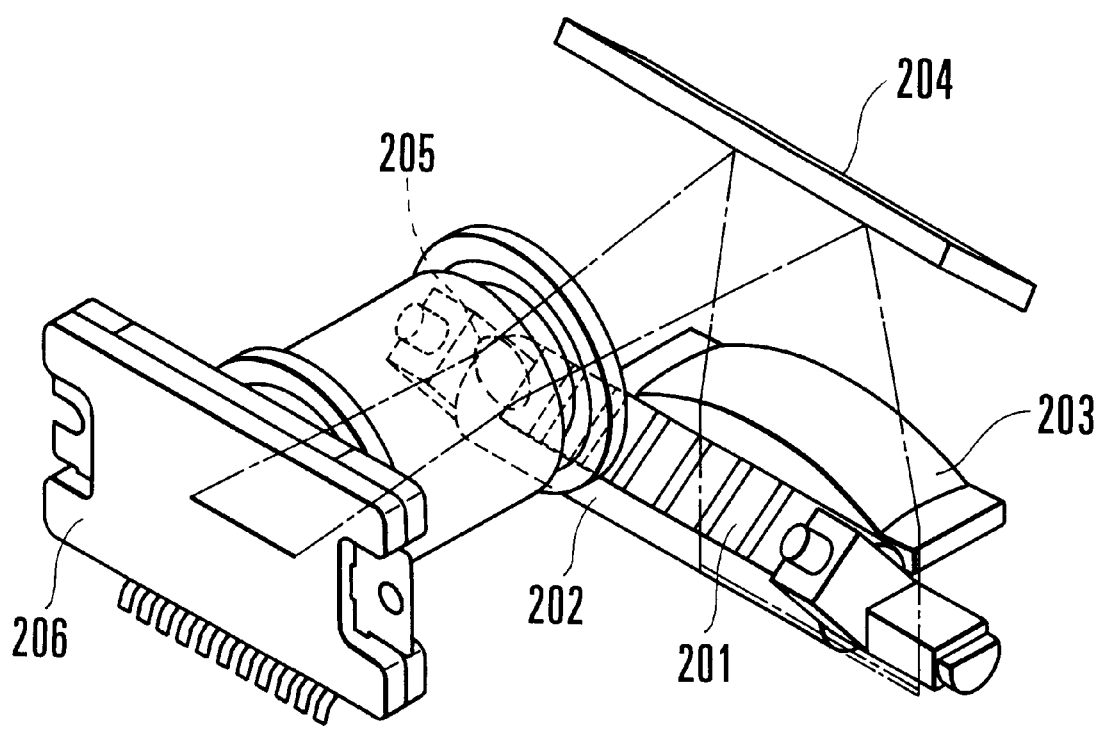
FIG. 2 is a schematic view showing the arrangement of optical-system components in the color scanner unit.

FIG. 2 is a schematic view showing the arrangement of an optical system in the interior of the color scanner unit shown in FIG. 1. An LED array 201 which serves as a light source for illuminating the original includes a plurality of LEDs which are arrayed in the direction of the width of an original from which to read data. Each of the LEDs is arranged to emit any one of three different colors, i.e., red (R), green (G) and blue (B) (red: $\lambda$=640 nm, green: $\lambda$=525 nm, and blue: $\lambda$=470 nm).

A cylindrical rod lens 202 is disposed in close proximity to the LED array 201 in parallel with the direction in which the LEDs of the LED array 201 are arrayed. The illuminating light emitted from the LED array 201 passes through the central portion of the lens working surface of the rod lens 202 and illuminates a surface of the original in an oblique direction. The light reflected from the original passes through a field lens 203 whose optical axis is perpendicular to the surface of the original, and the light which has passed through the field lens 203 is transmitted toward the aperture 205 along an optical axis which is 90° bent by a mirror 204 disposed in parallel with the direction of the width of the original from which to read data. Thus, the reflected light is made incident on the aperture 205. The aperture 205 is disposed in an image forming plane of the field lens 203, and the reflected light which has been focused on the aperture 205 is again focused on an image pickup surface of a photoelectric conversion element 206 by an image forming lens (not shown). Incidentally, the reduction ratio of the image forming lens is 0.45158.

Figure 3:
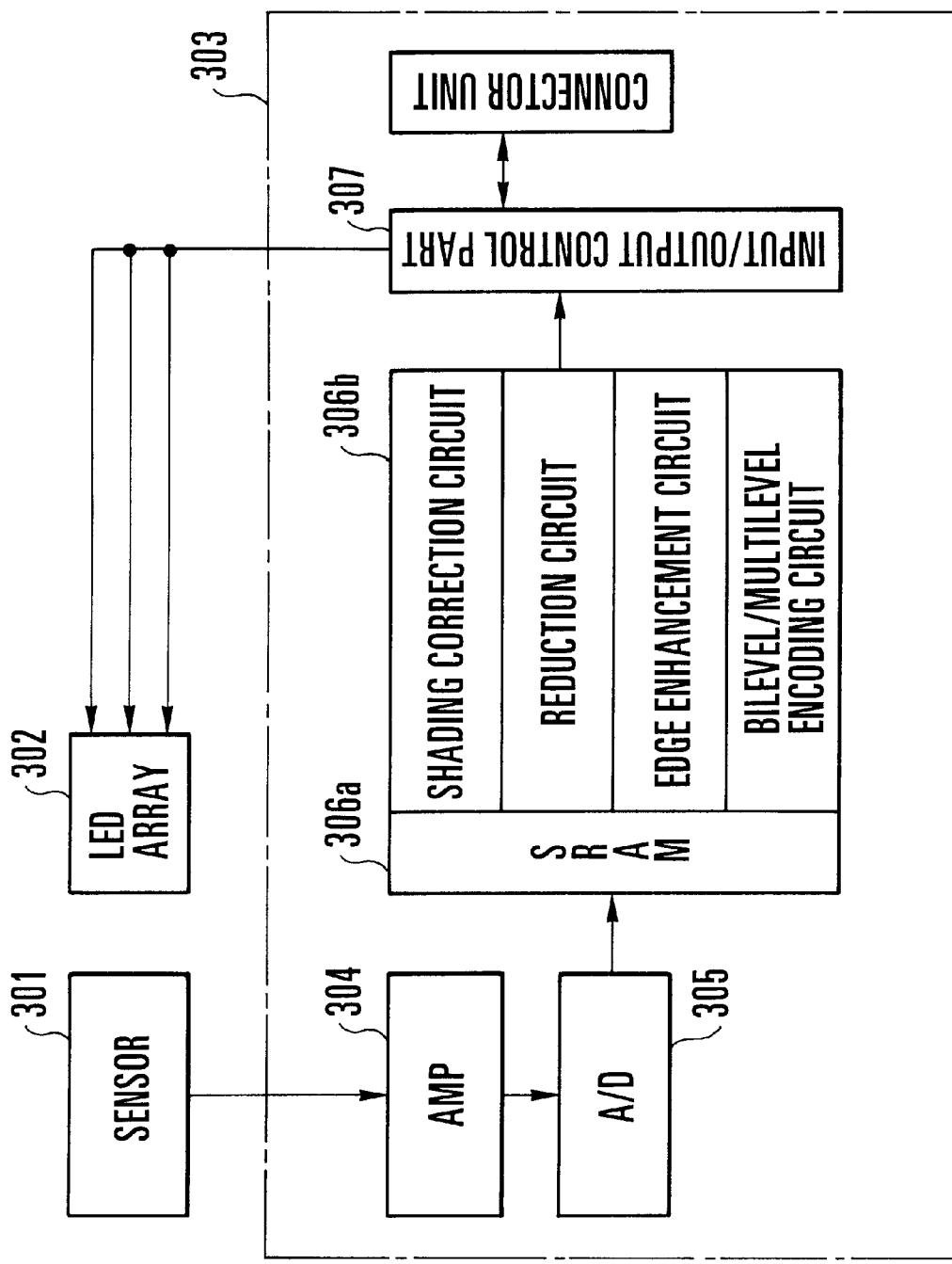
FIG. 3 is a block diagram showing the construction of the color scanner unit.
Figure 4:
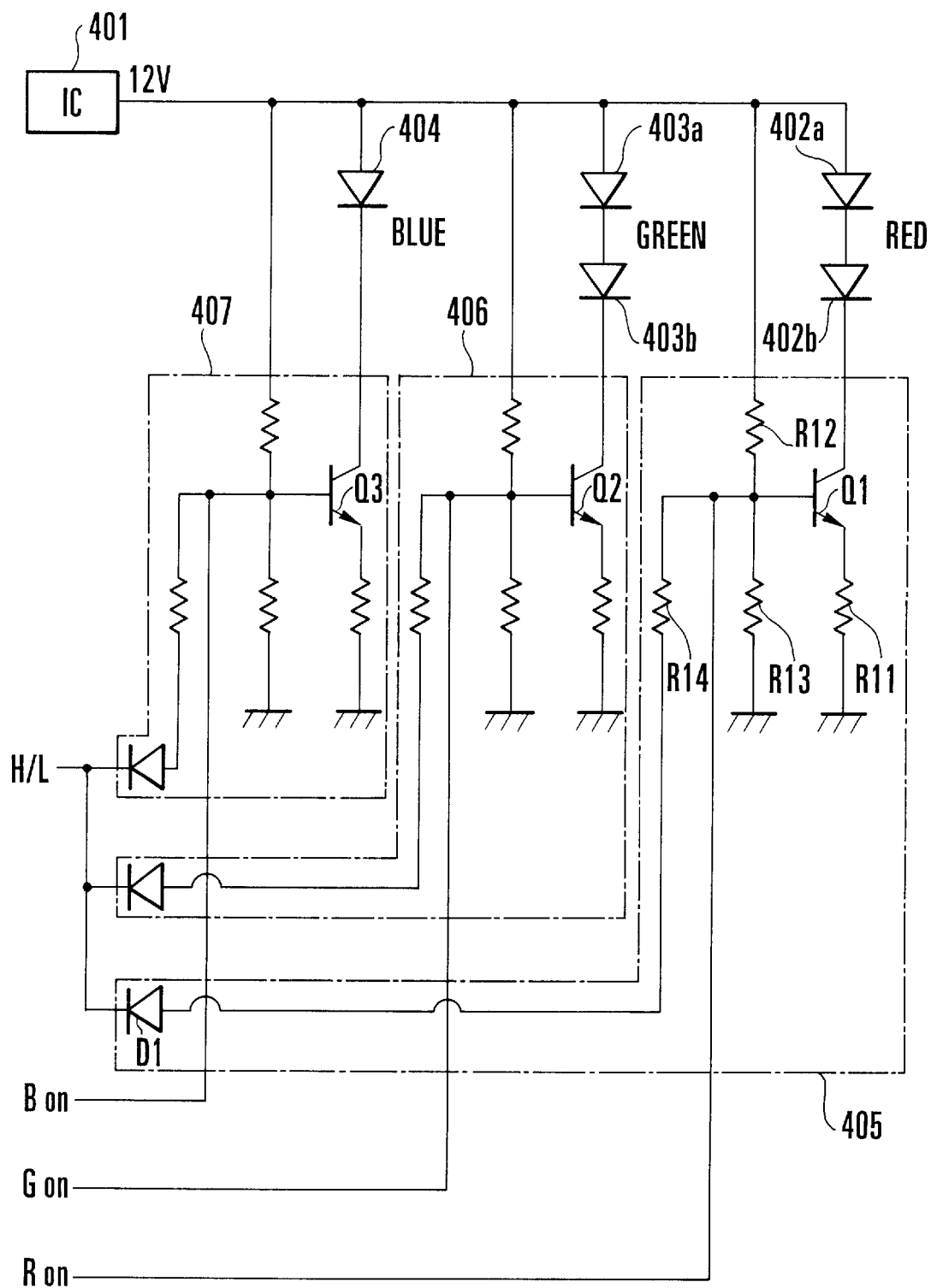
FIG. 4 is a block diagram showing the construction of an LED driving circuit of the color scanner unit.

FIG. 3 is a block diagram showing the internal construction of the color scanner unit shown in FIG. 1. In the construction shown in FIG. 3, a sensor 301 (which corresponds to the photoelectric conversion element 206 shown in FIG. 2) serves as a light-receiving element, and in the first embodiment, a 128-pixel monochrome CCD line sensor is used as the sensor 301. An LED array 302 (which corresponds to the LED array 201 shown in FIG. 2) serves as a light source for illuminating an original and includes a plurality of LEDs each of which emits any one of three different colors R, G and B. In the first embodiment, the LED array 302 includes two R LEDs, two G LEDs and one B LED, a total of five LEDs, and a switching circuit (to be described later), which is shown in FIG. 4, performs the light source switching operation of sequentially turning on these R, G and B LEDs so that a color image is read from the original. The number of LEDs is not limited to five, and may be arbitrarily increased or decreased as required.

The arrangement of the portion surrounded by chain lines in FIG. 3 is a custom IC (integrated circuit) 303 produced exclusively for the color scanner unit, and includes an amplifier (AMP) 304 which clamps the signal output from the sensor 301 at a predetermined voltage and amplifies the peak level of the clamped signal to an optimum range for an A/D converter on the basis of the result of a peak search which will be described later, a 10-bit A/D converter 305, an SRAM (static random-access memory) 306a, an image processing circuit 306b (which includes a shading correction circuit, a reduction circuit for making reductions in both column and line directions, an edge enhancement circuit and a bilevel/multilevel encoding circuit), and an input/output control part 307 for transmitting or receiving signals to or from the printer unit. Incidentally, the shading correction circuit makes a correction of the white level of an image signal by means of printer firmware.

FIG. 4 is a block diagram showing the construction of a circuit for switching the light sources of the LED array 302. In the construction shown in FIG. 4, an IC 401 is a 12-V-output 3-terminal regulator for supplying electrical power to the LEDs. A voltage of 12 V which is outputted from the IC 401 is supplied to each of the following LEDs, red LEDs 402a and 402b (which are included in the LED array 201 shown in FIG. 2 and in the LED array 302 shown in FIG. 3), green LEDs 403a and 403b (which are included in the LED array 302 shown in FIG. 3), and a blue LED 404 (which is included in each of the LED array 201 shown in FIG. 2 and the LED array 302 shown in FIG. 3).

Driving circuits 405, 406 and 407 for the respective R, G and B LEDs constitute constant-current circuits, respectively. First, the driving circuit 405 for the R LEDs 402a and 402b will be described below. If an R-on signal supplied to the base of a transistor Q1 for driving the R LEDs 402a and 402b is at a high level, the voltage of 12 V supplied from the IC 401 is divided by a resistor R12 and a resistor R13 and supplied to the base of the transistor Q1. Thus, driving current flows through the R LEDs by the amount required to make the divided voltage, $V_B$, equal to the sum, $V_{BE}+V_{R11}$, of the base-to-emitter voltage $V_{BE}$ of the transistor Q1 and the voltage decrease $V_{R11}$ at the resistor $R_{11}$. If the R-on signal is at a low level, the transistor Q1 is turned off and the R LEDs 402a and 402b are turned off. An H/L signal serves to switch over the magnitude of current which flows through the LEDs, and if the H/L signal is at a low level, a resistor R14 is connected to the resistor R13 in parallel, so that the divided voltage $V_B$ decreases and the LED driving current becomes smaller. The state in which such LED driving current is large and the state in which the LED driving current is small are hereinafter referred to as "strong driving" and "weak driving", respectively.

Since the driving circuit 406 for the green LEDs 403a and 403b and the driving circuit 407 for the blue LED 404 are identical in construction to the above-described driving circuit 405 for the red LEDs 402a and 402b, description is omitted herein.

The values of currents to flow through the respective LEDs 402a, 402b, 403a, 403b and 404 will be described below. When the R-on signal is at the high level and a G-on signal and the H/L signal are at high levels, 10 mA is supplied to each of the red LEDs 402a and 402b and the green LEDs 403a and 403b, whereas when the R-on signal and the G-on signal are at the high levels and the H/L signal is at a low level, 2.5 mA is supplied to each of the red LEDs 402a and 402b and the green LEDs 403a and 403b. The blue LED 404 is supplied with 20 mA when a B-on signal is at a high level and the H/L signal is at the high level, whereas when the B-on signal is at the high level and the H/L signal is at the low level, the blue LED 404 is supplied with 5 mA. By varying the set value of the driving current according to the color of each of the LEDs in the above-described manner, it is possible to absorb the difference between the intensity levels of color light which reaches the surface of the original, which difference occurs due to the number and arrangement of LEDs.

To read a color image by using the light-receiving sensor 301 and the LED array 302 shown in FIG. 3, the image reading device according to the first embodiment performs 3-pass reading based on a sequential color system.

First, only a first-color LED is turned on in the three-color LED array 302, and data indicative of the first color component for one line which corresponds to the reading width of the sensor 301 is obtained while the carriage is being moved. After the first-color LED has been turned off, the carriage is returned to its original position.

Then, data indicative of the second color component for the same line is obtained by turning on only a second-color LED in the LED array 302 without causing a line feed. In a similar manner, only a third-color LED is turned on to obtain data indicative of the third color component for the same line. After the completion of reading of RGB color data for one line, a line feed is caused to start reading from the next line.

This sequential lighting of the LEDs is controlled by the CPU of a personal computer which will be described later.

Figure 5:
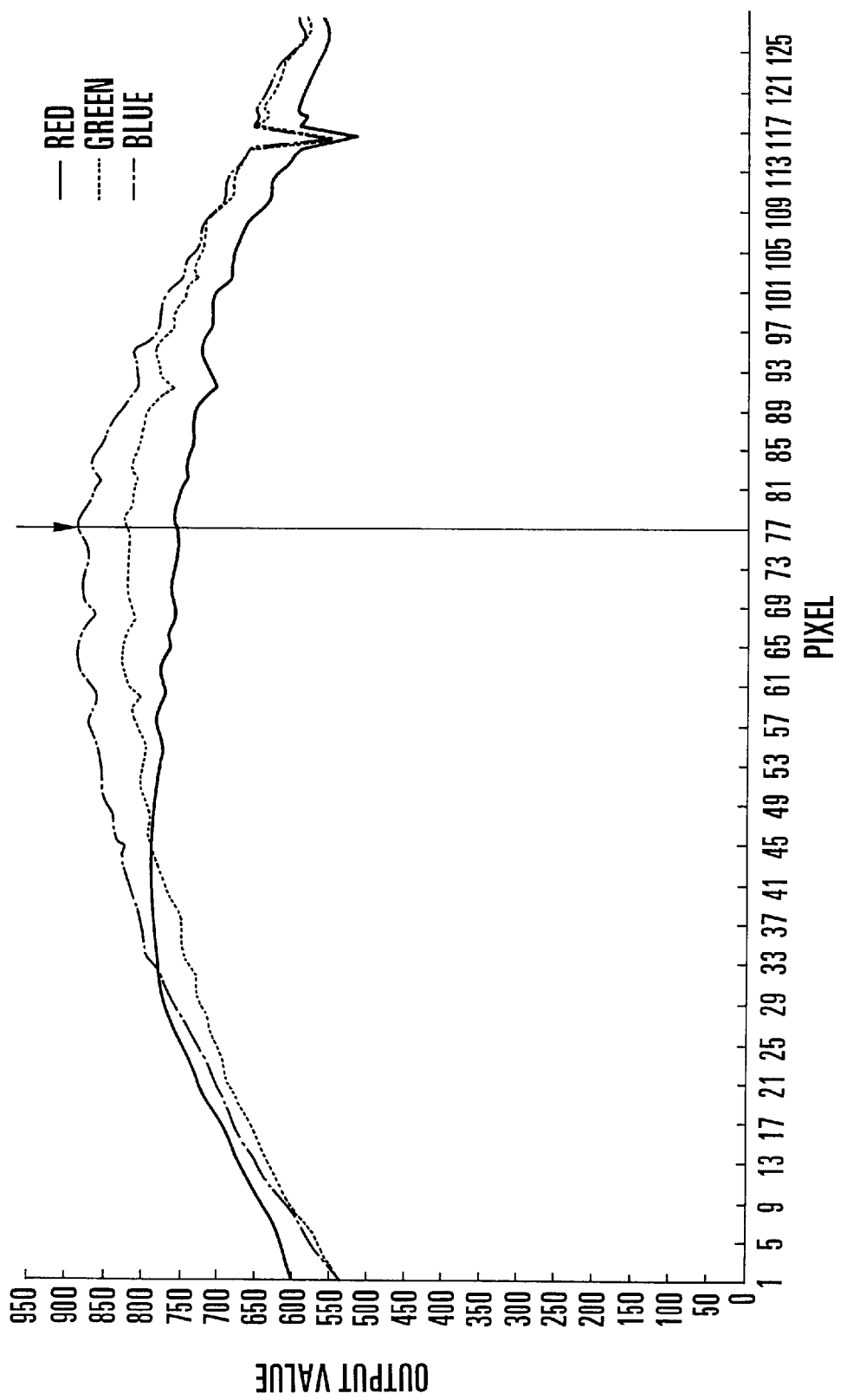
FIG. 5 is a graph showing R, G and B white reference profiles in the color scanner unit.

FIG. 5 shows the white data obtained when a white reference was obtained at room temperature (25° C.) by the color scanner unit according to the first embodiment. In FIG. 5, the vertical axis shows the value (10 bits) obtained by A/D-converting a photoelectrically converted signal, while the horizontal axis shows 128 pixels which are the total reading width of the light-receiving sensor 301. In FIG. 5, the solid line indicates the output from the red LEDs 402a and 402b, the dotted line indicates the output from the green LEDs 403a and 403b, and the dot chain line indicates the output from the blue LED 404.

As shown in FIG. 5, because of the arrangement of the LEDs and the positional relation between each of the LED and a lens, the outputs relative to the respective 128 pixels are not uniform, and the peak values of the output profiles of the respective colors are not coincident.

For this reason, in the first embodiment, image reading is performed with central 94 pixels between the 33rd pixel and the 96th pixel.

The white-reference peak search function of the IC 303 shown in FIG. 3 will be described below.

White reference data for each color is composed of 10 bits×128 pixels. The gain of the amplifier 304 provided at the front stage of the A/D converter 305 is determined so that the white reference data for 128 pixels exit over the full range, by detecting the peak value and the bottom value of the white reference data for 128 pixels and setting the detected peak and bottom values to the maximum and minimum values of the A/D converter 305, respectively.

If such peak search function is used, in the case of the white profile of the blue LED shown in FIG. 5, data relative to the 77th pixel indicated by an arrow is detected as a peak value, and gain data for the amplifier 304 is determined so that the output relative to the 77th pixel coincides with the peak of the A/D conversion range of the A/D converter 305.

Figure 6:
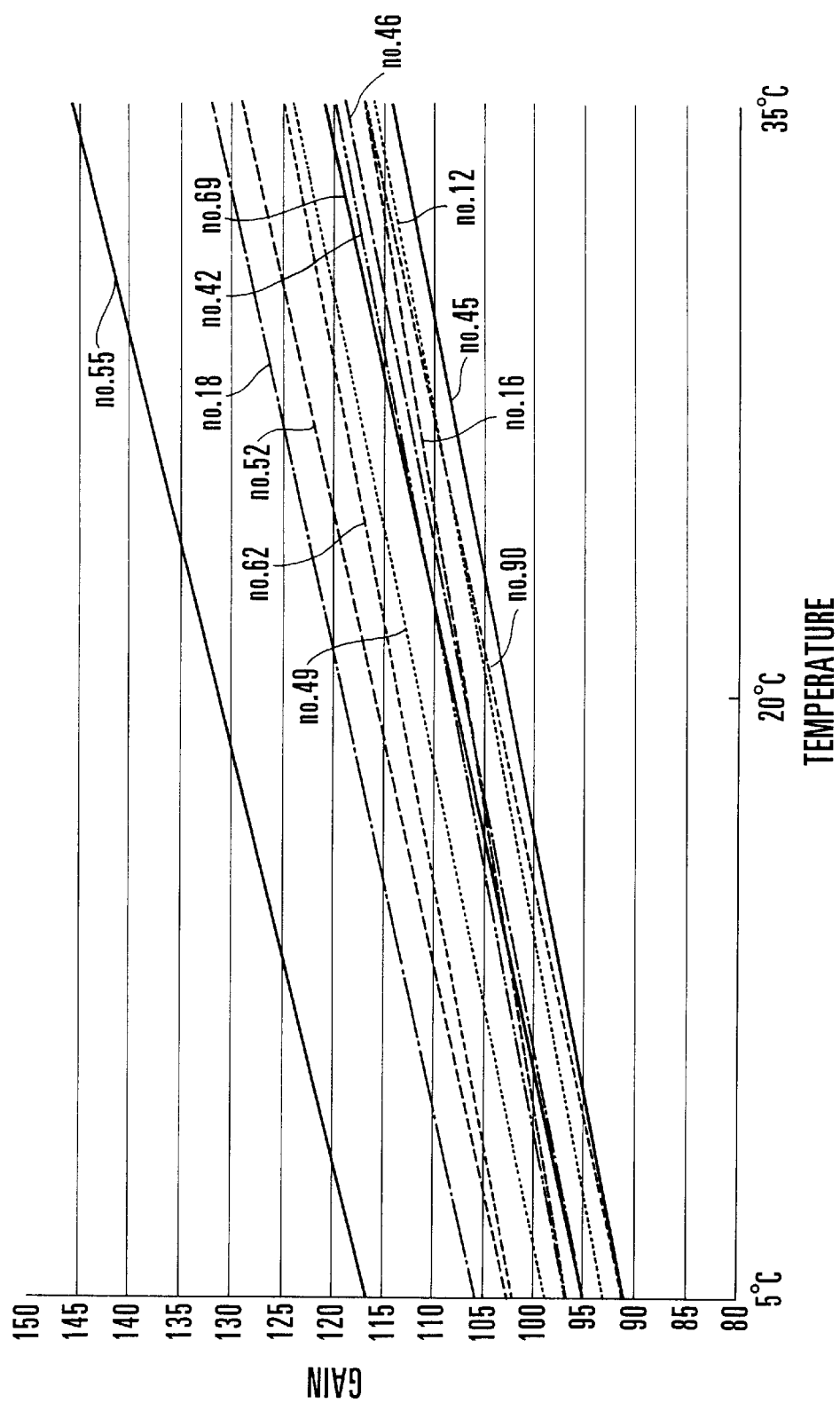
FIG. 6 is a graph showing the relation between the gain output value of an R (red) LED in the color scanner unit and environmental temperature.
Figure 7:
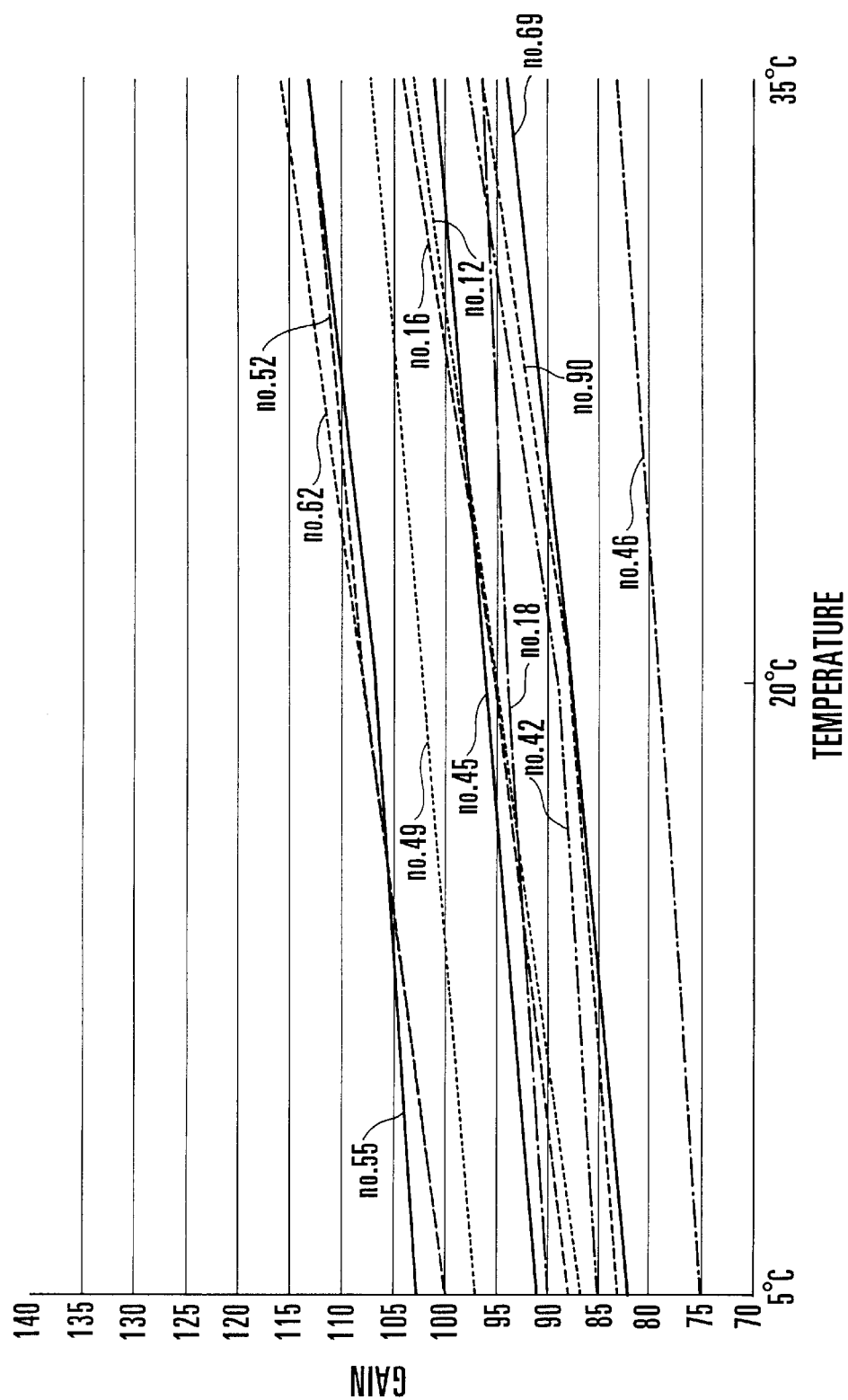
FIG. 7 is a graph showing the relation between the gain output value of a G (green) LED in the color scanner unit and environmental temperature.
Figure 8:
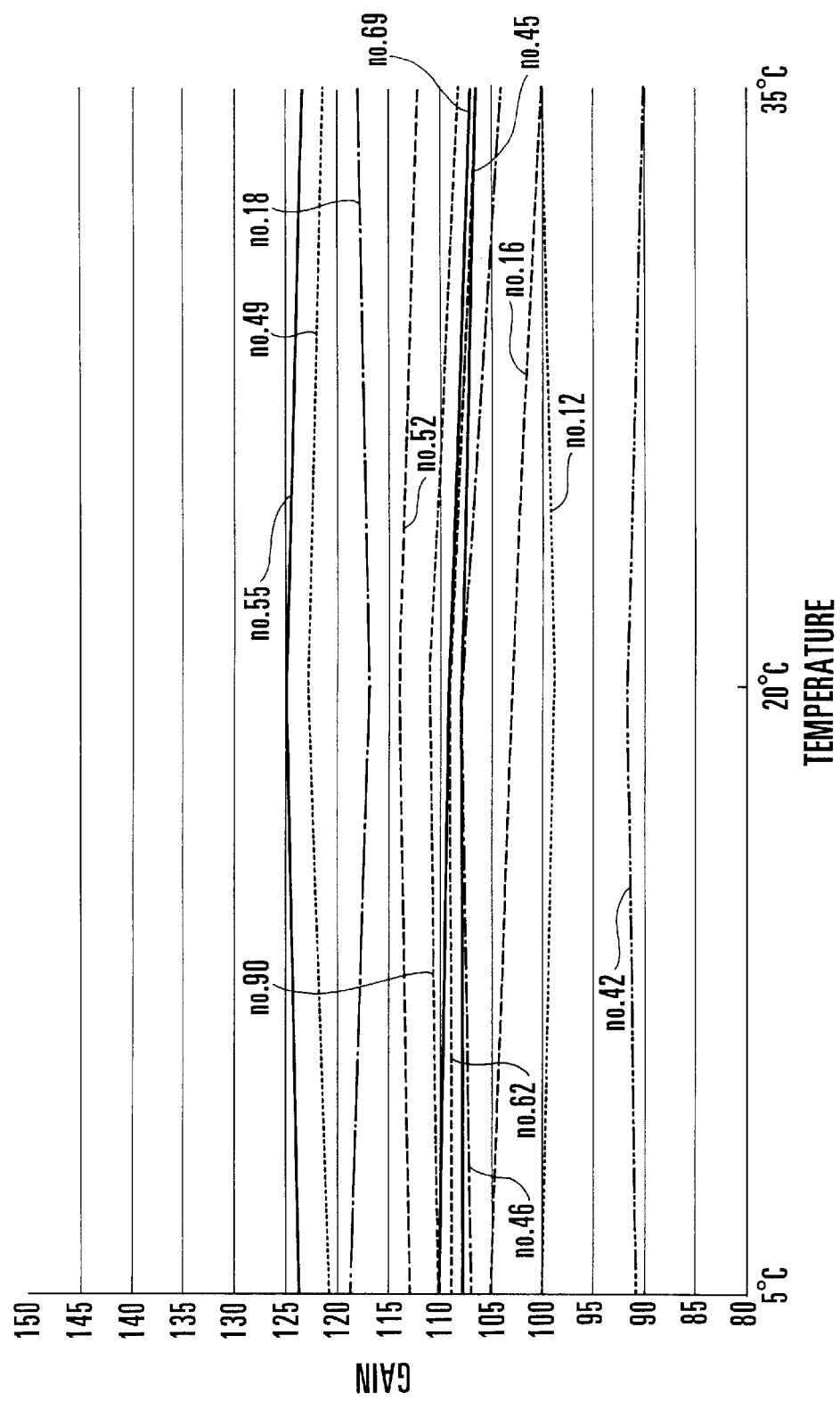
FIG. 8 is a graph showing the relation between the gain output value of a B (blue) LED in the color scanner unit and environmental temperature.

FIG. 6 is a graph showing the relation between the gain data and the environmental temperature characteristics of a red LED, FIG. 7 is a graph showing the relation between the gain data and the environmental temperature characteristics of a green LED, and FIG. 8 is a graph showing the relation between the gain data and the environmental temperature characteristics of a blue LED.

Since LEDs for three different colors R, G and B are used as color elements when a color image is to be read, it is necessary to set white references for the respective colors because the respective LEDs have different output and temperature characteristics.

For this reason, when white references are to be obtained, the custom IC 303 shown in FIG. 3 detects the peak value of the white reference profile of each of the color signals from the light-receiving sensor 301 and determines the gain of the amplifier 304 which can be set in 256 steps for setting the white references in an optimum range for A/D conversion.

Data for the white reference of each of the colors is composed of:

(1) white data for 128 pixels×10 bits,
(2) gain data for 8 bits, and
(3) black data for 128 pixels×8 bits.

Management of the data for the white references of all the colors is performed in the form of adding temperature data (2 bytes) and ID data (2 bytes) to the data for the three colors R, G and B.

The construction of the whole of a notebook-sized personal computer provided with a printer unit on which to mount the color scanner unit according to the first embodiment having the above-described construction will be described below with reference to FIGS. 9 and 10.

Figure 9:
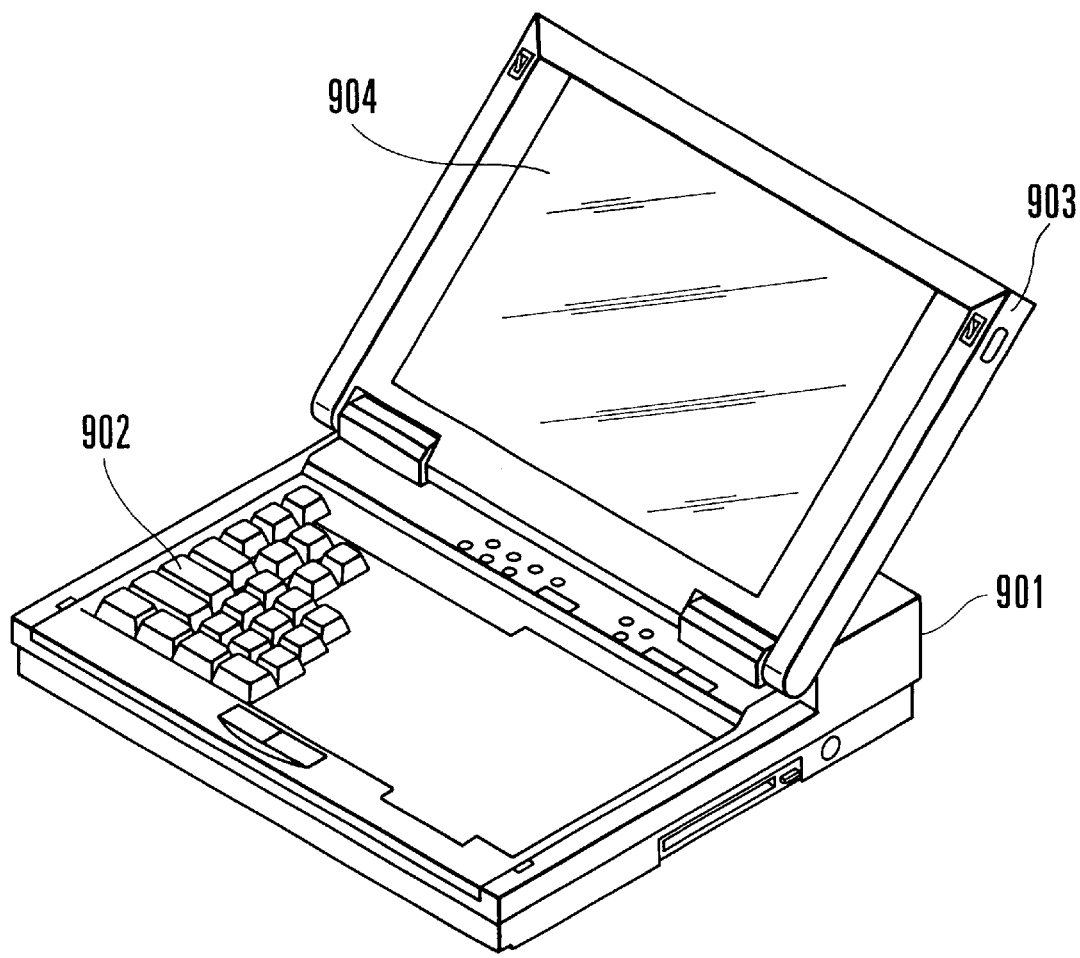
FIG. 9 is a diagrammatic perspective view showing the external appearance of a notebook-sized personal computer provided with the color scanner unit.

FIG. 9 is a diagrammatic perspective view showing the external appearance of the whole of the notebook-sized personal computer which serves as an apparatus for controlling the image reading device according to the first embodiment. As shown in FIG. 9, a body 901 has a keyboard 902 on its top side. The body 901 has a lid 903 capable of covering or uncovering the keyboard 902, and the lid 903 has a display part 904. This display part 904 is, for example, an 11.8-inch color display which uses a TFT (Thin Film Transistor) color liquid crystal display or the like. The rear portion of the body 901 is provided with a built-in printer unit part.

Figure 10:
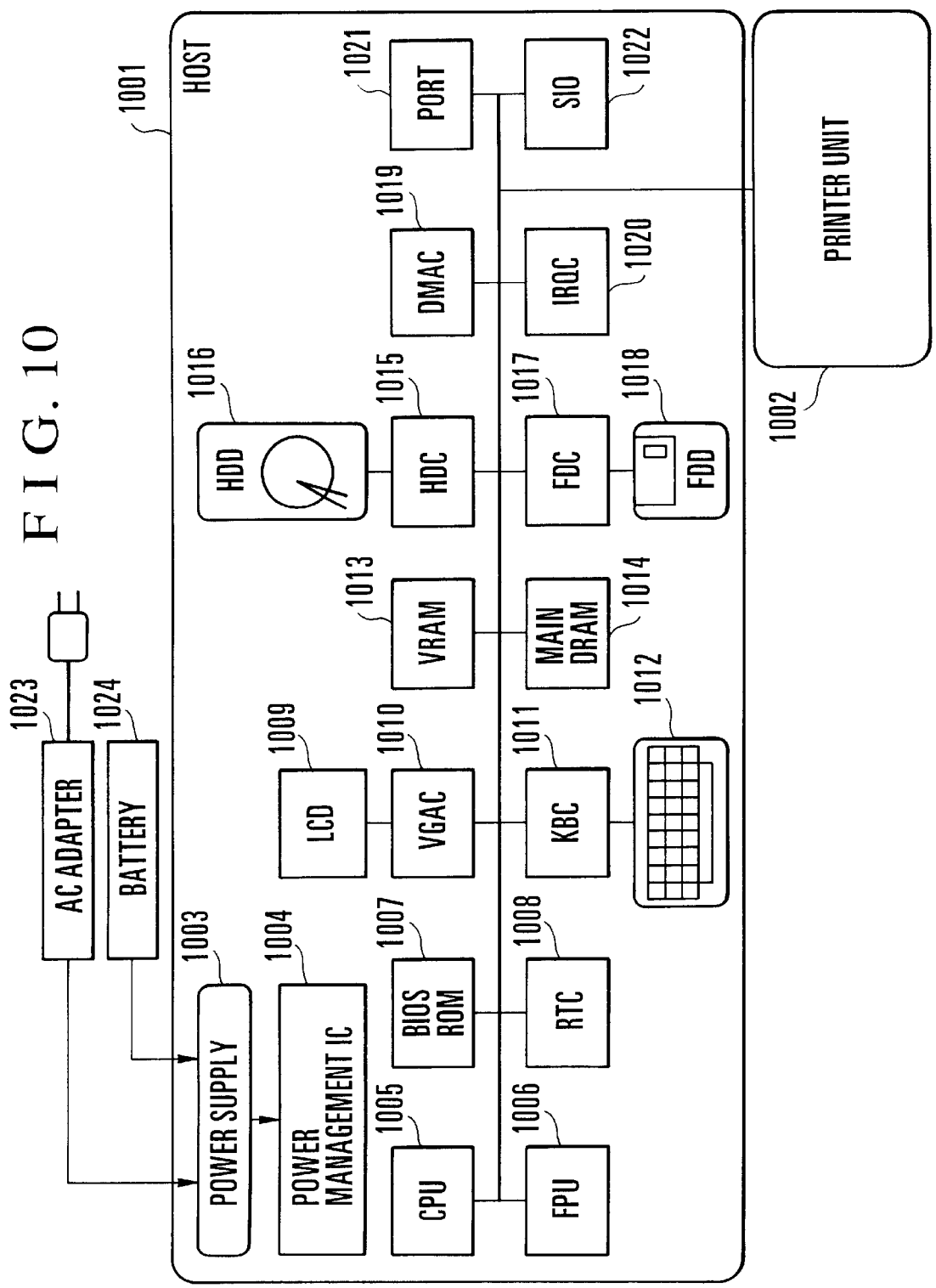
FIG. 10 is a block diagram showing the construction of the notebook-sized personal computer shown in FIG. 10.

FIG. 10 is a block diagram showing the internal construction of the notebook-sized personal computer shown in FIG. 9. As shown in FIG. 10, the notebook-sized personal computer includes a host part 1001 and a printer unit 1002 which are connected to each other by an internal bus.

The host part 1001 has a power supply part 1003 which serves as a drive source, a power management IC 1004, a central processing unit (CPU) 1005, a floating-point arithmetic unit (FPU) 1006, a basic input/output system read-only memory (BIOS ROM) 1007, a real time clock (RTC) 1008, a liquid crystal display (LCD) 1009 (which corresponds to the display part 904 shown in FIG. 9), a video graphics array controller (VGAC) 1010, a keyboard controller (KBC) 1011, a keyboard 1012 (which corresponds to the keyboard 902 shown in FIG. 9), a video random access memory (VRAM) 1013, a main dynamic random access memory (MAIN DRAIN) 1014, a hard disk controller (HDC) 1015, a hard disk (HDD) 1016, a floppy disk controller (FDC) 1017, a floppy disk (FDD) 1018, a direct memory access controller (DMAC) 1019, an interrupt controller (IRQC) 1020, an expansion port (PORT) 1021, and a serial interface (SIO) 1022. An AC adapter (rated voltage: 20 V, 54 W) and a battery 1024 such as a nickel-oxygen secondary batter (rated voltage: 12 V, 2700 mA/h) are available as the power supply part 1003.

A printer unit built in the notebook-sized personal computer having the above-described construction as well as a color scanner unit and a print head unit either of which can be removably mounted on the printer unit will be described below with reference to FIGS. 11 and 12.

Figure 11:
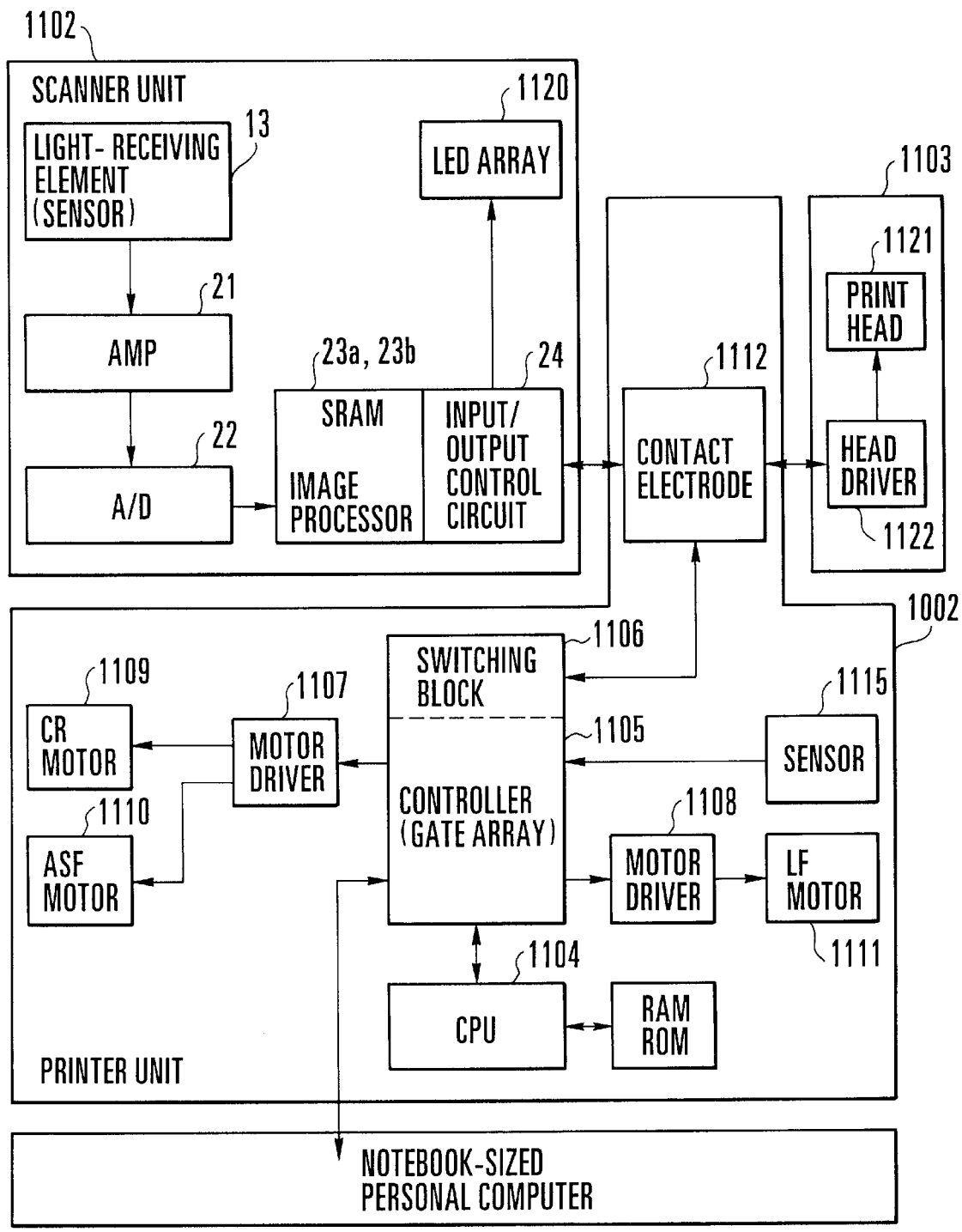
FIG. 11 is a block diagram showing the constructions of the color scanner unit, a printer unit and a print head unit of the notebook-sized personal computer shown in FIG. 10.

FIG. 11 is a block diagram showing the construction of the printer unit 1002 as well as those of the scanner unit 1102 and the print head unit 1103 either of which can be connected to the printer unit 1002.

The CPU 1104 and the controller 1105 of the printer unit 1002 execute control of three motors (a CR motor 1109 for the carriage, an LF motor 1111 for line feed and an ASF motor 1110 for automatic sheet feed) via motor drivers 1107 and 1108, control of a sensor 1115 for detecting home position, ASF position and supply or discharge of a recording sheet, and control of the driving of the scanner unit 1102 and the print head unit 1103. As described previously, either one of the scanner unit 1102 and the print head unit 1103 can be mounted on the printer unit 1002. Each of the scanner unit 1102 and the print head unit 1103 has a portion for connection to the carriage, which portion is provided with a contact electrode 1112. When the scanner unit 1102 or the print head unit 1103 is mounted on the printer unit 1002, the scanner unit 1102 or the print head unit 1103 and the printer unit 1002 are electrically connected to each other by the contact electrode 1112.

The connector portion of each of the scanner unit 1102 and the print head unit 1103 has an electrode which indicates its own ID, and the CPU 1104 reads such ID and determines whether the unit mounted is the scanner unit 1102 or the print head unit 1103. The print head unit 1103 includes a print head 1121 and a head driver 1122 for printing C, M and Y ink colors or C, M, Y and K ink colors.

Figure 12:
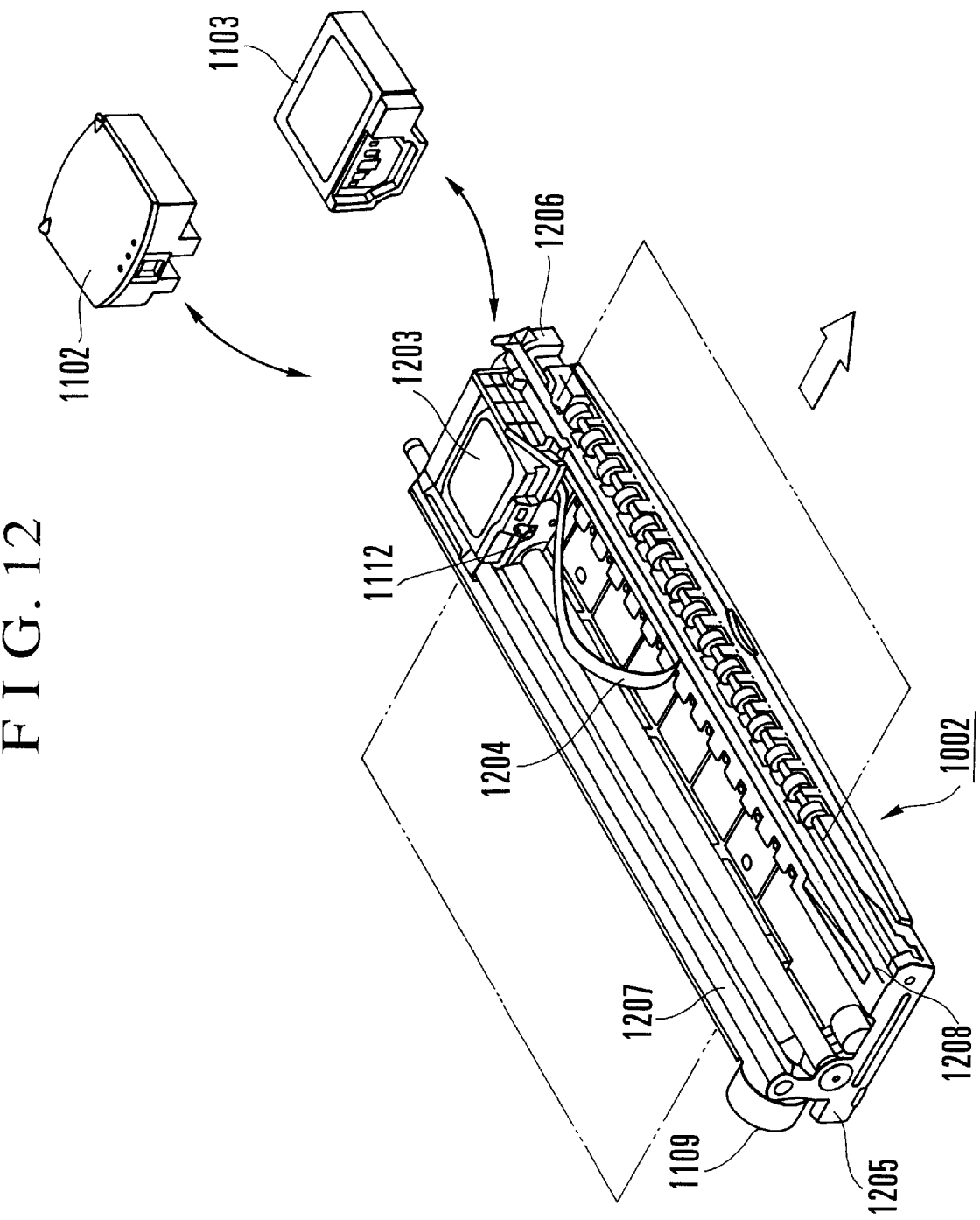
FIG. 12 is a diagrammatic perspective view showing the state in which the color scanner unit or the print head unit is mounted on or removed from the printer unit of the notebook-sized personal computer shown in FIG. 10.

FIG. 12 is a diagrammatic perspective view aiding in describing the state in which the scanner unit 1102 or the print head unit 1103 is mounted on the printer unit 1002. As shown in FIG. 12, the scanner unit 1102 for reading an image from an original and the print head unit 1103 for recording on a recording medium are exchangeably mounted on the printer unit 1002. The scanner unit 1102 has approximately the same shape as the print head unit 1103, and is selectively exchangeably mounted on the printer unit 1002.

A contact electrode 1112 which allows transmission or reception of a signal via the connector portion of the scanner unit 1102 is disposed in a carriage 1203. An image signal outputted from the scanner unit 1102 is processed by the CPU 1104 of the printer unit 1002 shown in FIG. 11 via the contact electrode 1112 and a flexible cable 1204. The carriage 1203 is driven by the CR motor 1109 to make a reciprocating motion along a slide shaft 1207 and a slide plate 1208 which are disposed between side plates 1205 and 1206 of a frame.

The electrical characteristics of an LED which is a light source in the color scanner unit according to the first embodiment will be described later.

Figure 13:
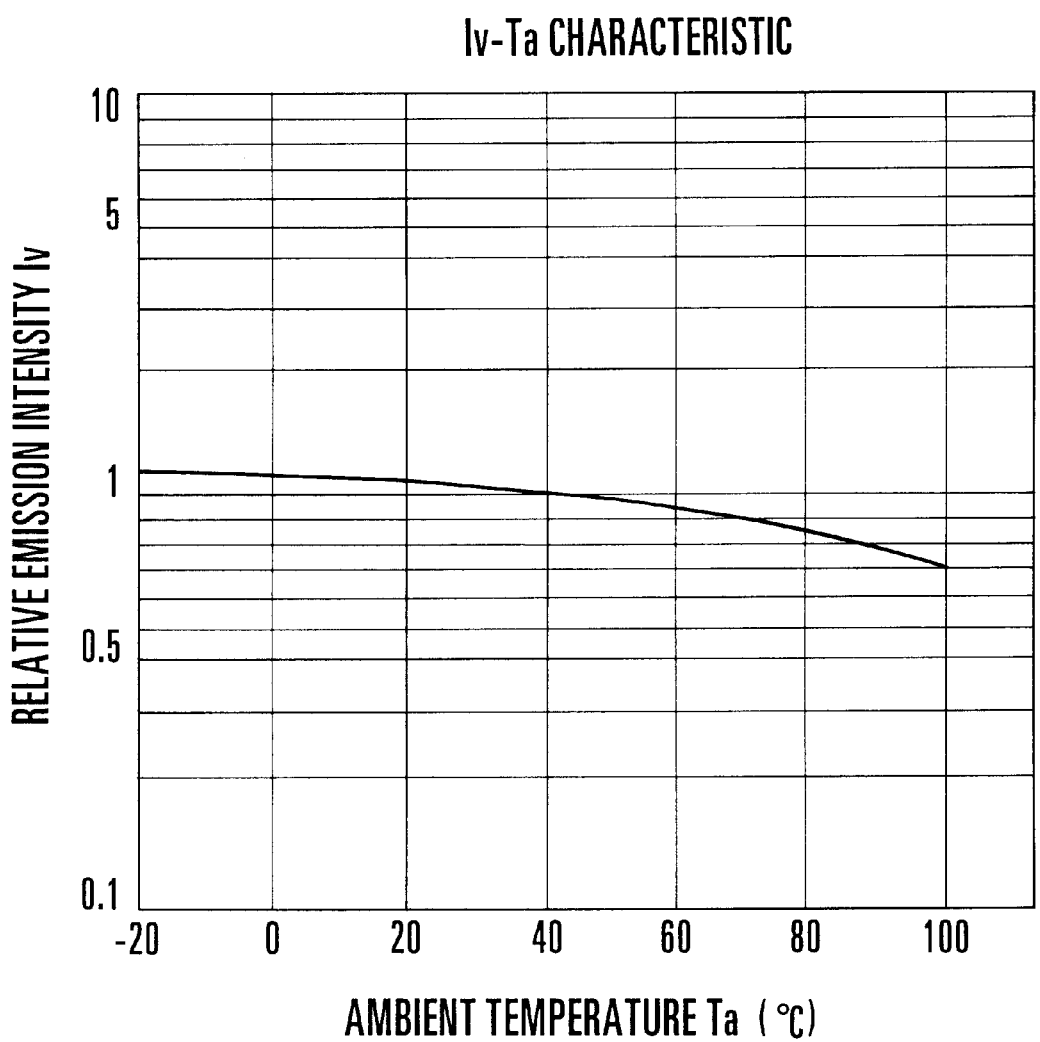
FIG. 13 is an $I_V$-$T_a$ characteristic curve diagram showing the relation between ambient temperature and the relative emission intensity of an LED in the color scanner unit.

FIG. 13 is a graph showing the relation between the ambient temperature $T_a$ and the relative emission intensity $I_v$ of the LED. It is apparent from FIG. 13 that as the ambient temperature increases, the relative emission intensity of the LED decreases.

Figure 14:
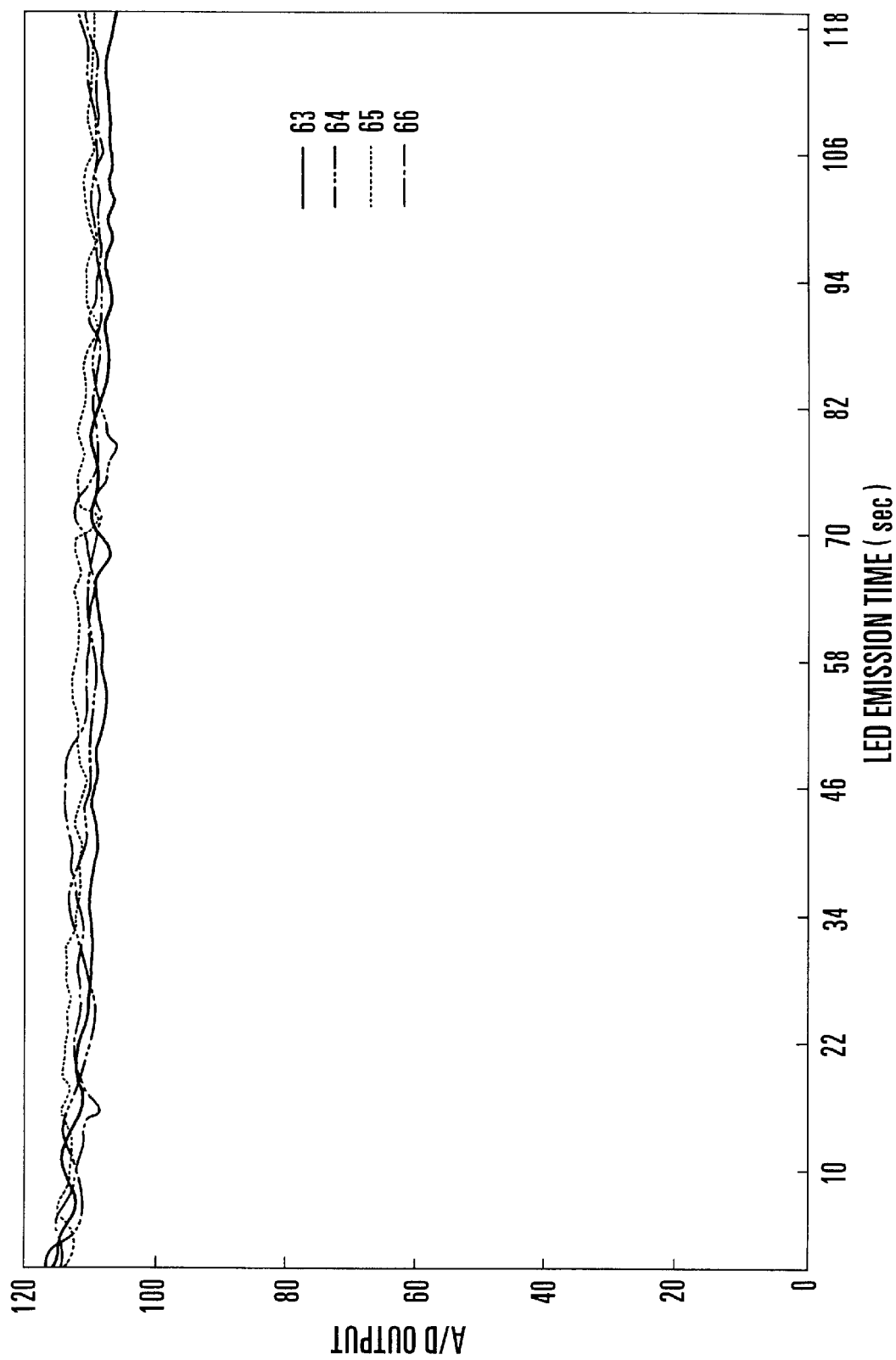
FIG. 14 is a graph showing output characteristic curves in the continuous lighting of the LED in the color scanner unit.

FIG. 14 is a graph showing the data which was read from a white reference sheet by the color scanner unit of the first embodiment with storage time being set to 256 μsec and an increased driving current being supplied to the LED. In FIG. 14, the horizontal axis represents time (seconds) which elapsed after the LED had been turned on, while the vertical axis represents the value obtained when an image signal outputted from the color scanner unit was represented with 256 levels.

Although a light-receiving element 13 of the color scanner unit according to the first embodiment has 128 pixels, FIG. 14 shows only the data relative to the 63rd to 66th pixels.

As shown in FIG. 14, after the LED has been turned on, the LED generates heat and its relative emission intensity $I_v$ decreases. The variation in the relative emission intensity $I_v$ is not proportional to time, and an abrupt variation occurs immediately after the start of an emission.

In the image reading operation of the color scanner unit, the emission of the LED during image reading is effected in the state of strong driving so that the S/N ratio of the light-receiving element can be made higher, but while the carriage is returning to the home position, the LED is turned off to reduce the power consumption of the LED. It is considered, therefore, that the relative emission intensity $I_v$ of the LED is most stable when the temperature rise of the LED is approximately saturated immediately before the start of a carriage return; in FIG. 14, when the output level of the light-receiving element is approximately 110.

For this reason, in the first embodiment, preheat/warmth retention control is performed to prevent output variations due to a temperature rise of the LED during image reading in the same environment. The equilibrium condition of heat in the image reading operation is:

[R(strong driving, 100%)+G(strong driving, 100%)+B(strong driving, 100%)]/6=one color(strong driving, 100%)/2.

The left side of the above expression represents that the carriage makes three reciprocations, i.e., six scans, during scanning for reading a color image. Accordingly, the above expression represents that the amount of generated heat is equal to ½ of the amount of heat generated when a one-color LED is made to emit light, as shown on the right side. Incidentally, the percentage shown in each pair of parentheses of the above expression is the duty of emission time, and in the first embodiment, the blinking of the LED is controlled with a frequency such as 3.9 kHz, 6.25 kHz or 6.51 kHz, and the emission duty of the LED can be controlled to be 0%, 25%, 50%, 75% and 100%, on the basis of data which is set at a predetermined bit of a register (not shown).

To hold this state until the next image reading operation is started after the relative emission intensity $I_v$ of the LED has been brought to a stable state, it is necessary to make the LED consume power equal to that to be consumed during an image reading state. Control for this is warmth retention control. The warmth retention control can be performed under the following warmth retention condition:

warmth retention=R, G(weak driving, 100%).

Figure 15:
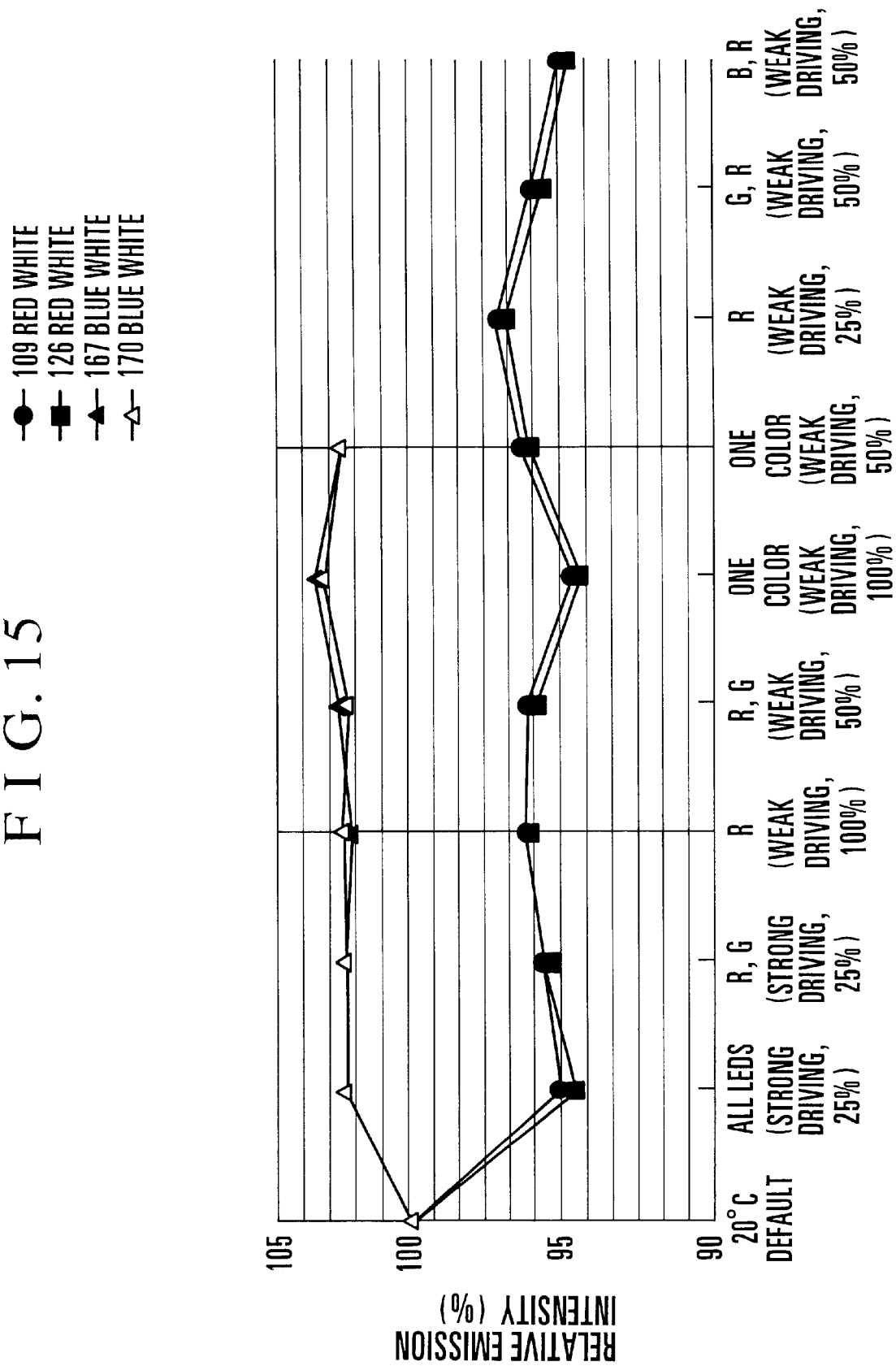
FIG. 15 is a graph showing warmth retention data in the color scanner unit.

FIG. 15 shows a variation in the emission intensity of each LED with respect to various warmth retention conditions in the color scanner unit according to the first embodiment. In FIG. 15, the vertical axis represents relative emission intensity with the emission intensity of each LED which is not placed under the warmth retention control being set to 100%, while the horizontal axis represents the warmth retention conditions. In FIG. 15, "one color (strong driving, 50%)" represents the state of current which is made to flow through each LED during image reading, and similar emission intensity is obtained under the condition of "R (weak driving, 100%)".

If warmth retention is effected under the condition of "R (weak driving, 100%)", it is possible to maintain the same state as image reading irrespective of the color (red or blue) of each LED. Incidentally, the term "109 RED WHITE" shown in the legend of FIG. 15 represents a white reference value which was obtained from the 109th pixel of a CCD when the red LED was made to emit light, and the other terms also represent similar contents. Since the thermal variation of the green LED is small, the data is not shown in FIG. 15.

As is apparent from FIG. 14, when about 60 sec passes after the start of an emission from the LED, the output level of the light-receiving element reaches "110" which corresponds to a stable state.

For this reason, in the first embodiment, preheat time is set to 60 sec. A temperature sensor such as a thermistor may also be provided in the scanner unit so that the preheat time can be managed by measuring actual temperature.

Incidentally, during preheating, it is desirable to turn on all the LEDs so that the stable state can be reached in a shortest time.

In this manner, in the same environment, it is possible to stably obtain an image of high quality by performing the preheat/warmth retention control.

In addition, as described above, the LEDs are controlled so that their total energy consumption is made equal during normal reading and during preheating.

Furthermore, in the image reading device according to the first embodiment, even during white reference reading, the LEDs are controlled in accordance with the total energy consumption.

As shown in FIGS. 16 to 18, the device according to the first embodiment has three kinds of image reading modes, i.e., a color mode, a monochrome multilevel mode and a monochrome bilevel mode, and each of the image reading modes has five kinds of resolutions, 360×360 dpi, 180×180 dpi, 90×90 dpi, 200×360 dpi and 300×360 dpi. On the basis of the relation between the five kinds of resolutions and the speed of the carriage, charge is stored in any one of four kinds of storage time, i.e., 256 μs, 320 μs, 307 μs and 288 μs.

Figure 19:
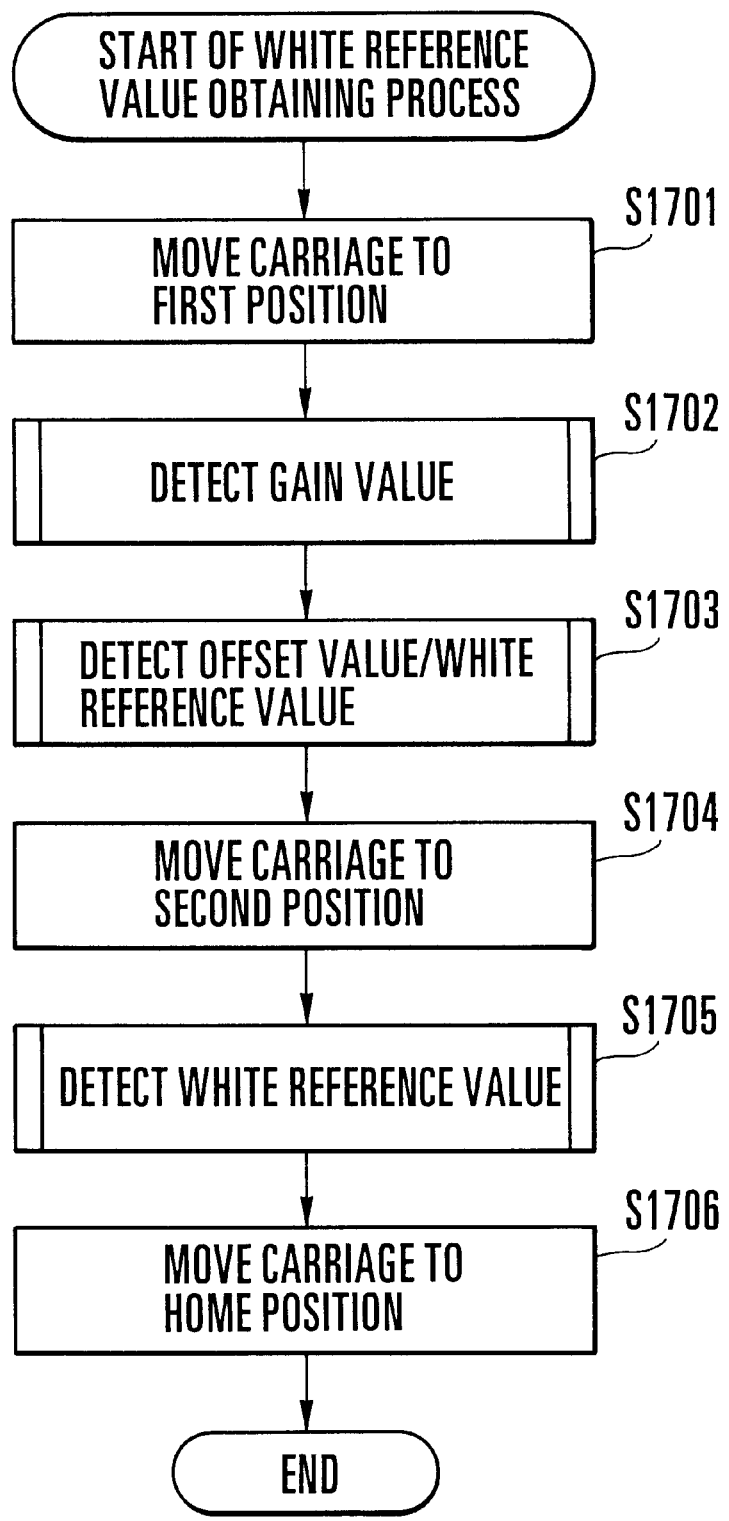
FIG. 19 is a flowchart showing the flow of a white-reference-value obtaining process operation in the color scanner unit.

A white-reference-value obtaining process operation will be described below with reference to FIG. 19. FIG. 19 is a flowchart showing the flow of the white-reference-value obtaining process operation. If the white-reference-value obtaining process operation is started, the carriage is moved to a first position in Step S1701, and in the next step S1702, the processing of detecting a gain value is performed. Then, in Step S1703, the processing of detecting an offset value/ white reference value is performed, and after the completion of this detecting processing, the carriage is moved to a second position in Step S1704. Then, in Step S1705, the processing of detecting a white reference value is again performed, and after the completion of this processing, the carriage is moved to the home position in Step S1706 and this process operation is completed.

Figure 20:
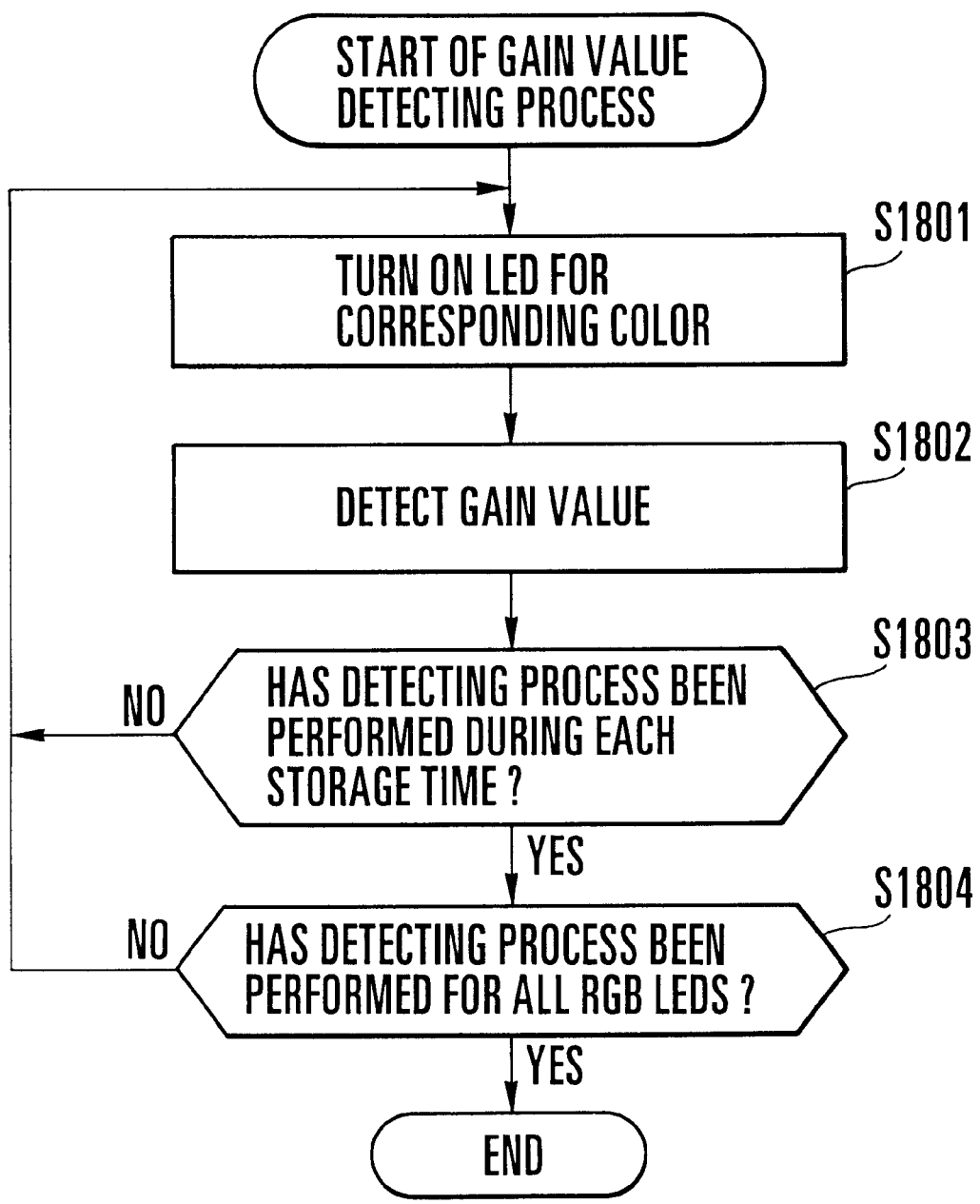
FIG. 20 is a flowchart showing the flow of a gain value detecting process operation in the color scanner unit.

The gain value detecting process operation performed in Step S1702 of the flowchart shown in FIG. 19 will be described below with reference to the flowchart shown in FIG. 20. If the gain value detecting process operation is started, an LED for a required color is turned on in Step S1801. Then, in Step S1802, a gain value detecting process is performed. Then, in Step S1803, it is determined whether the gain value detecting process has been performed in a storage time selected from among the four kinds of storage time. If the gain value detecting process is not yet performed in the selected storage time, the process returns to Step S1801, in which the LED for the required color is turned on.

On the other hand, if it is determined in Step S1803 that the gain value detecting process has been performed in the selected storage time, the process proceeds to Step S1804, in which the gain value detecting process has been performed on all the R, G and B LEDs. If the gain value detecting process has not yet been performed on all the R, G and B LEDS, the process returns to Step S1801, in which the LED for the required color is turned on. If the gain value detecting process has been performed on all the R, G and B LEDS, the gain value detecting process is completed.

Figure 21:
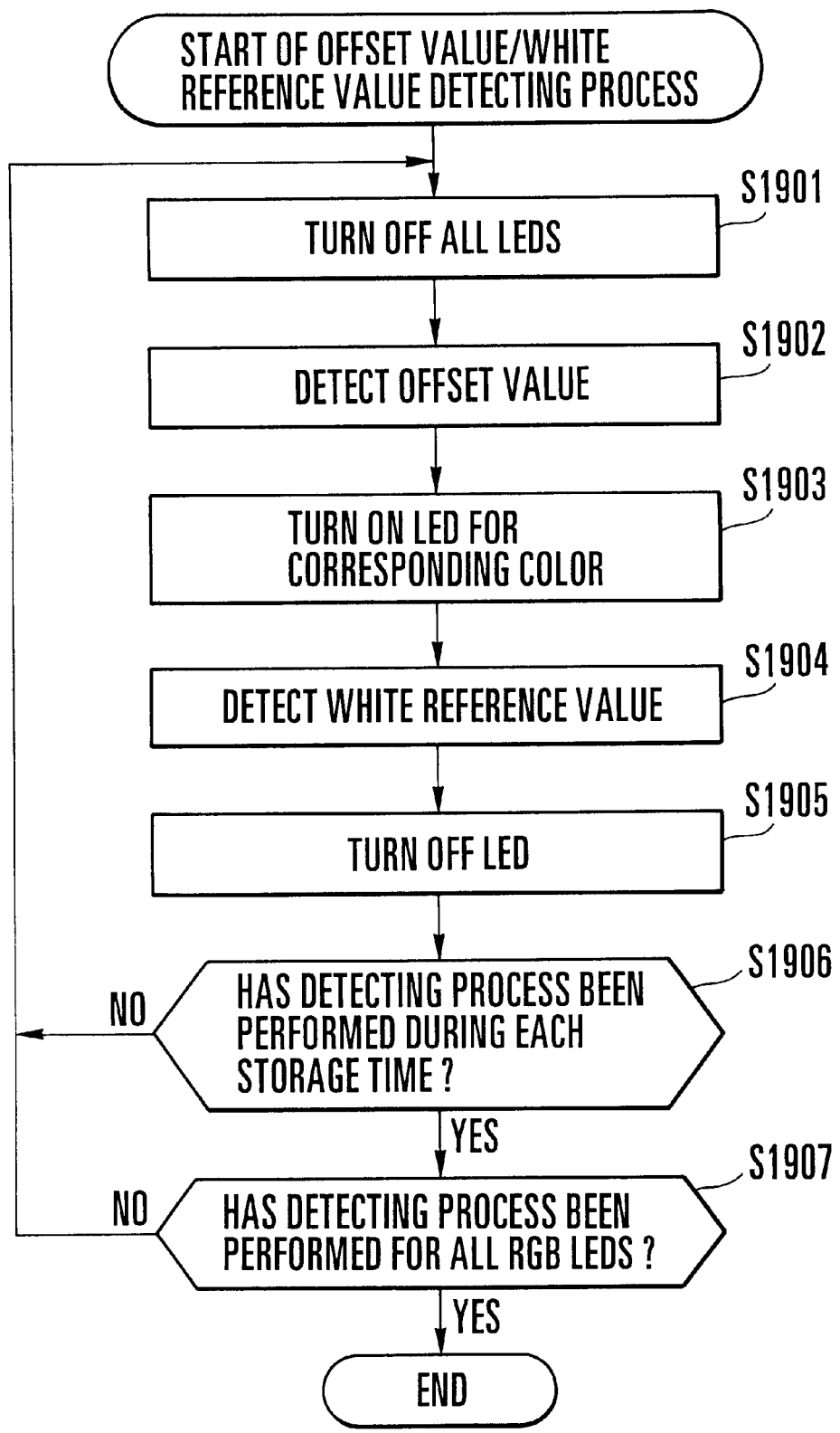
FIG. 21 is a flowchart showing the flow of an offset value/white reference value detecting process operation in the color scanner unit.

The offset value/white reference value detecting process operation performed in Step S1703 of the flowchart shown in FIG. 19 will be described below with reference to the flowchart shown in FIG. 21. If the offset value/white reference value detecting process operation is started, all the LEDs are turned off in Step S1901, and in the next step S1902, the processing of detecting an offset value detecting process is performed. Then, in Step S1903, an LED for a required color is turned on. Then, in Step S1904, the processing of detecting a white reference value is performed. Then, in Step S1905, the LED for the required color is turned off, and in the next step S1906, it is determined whether the offset value/white reference value detecting process has been performed in a storage time selected from among the four kinds of storage time. If this process has not yet been performed in the selected storage time, the process returns to Step S1901, in which the LED for the required color is turned off.

On the other hand, if it is determined in Step S1906 that the offset value/white reference value detecting process has been performed in the selected storage time, the process proceeds to Step S1907, in which it is determined whether the offset value/white reference value detecting process has been performed on all the R, G and B LEDs. If such detecting process has not yet been performed on all the R, G and B LEDs, the process returns to Step S1901, in which the LED for the required color is turned off. If such detecting process has been performed on all the R, G and B LEDs, the offset value/white reference value detecting process operation is completed.

Figure 22:
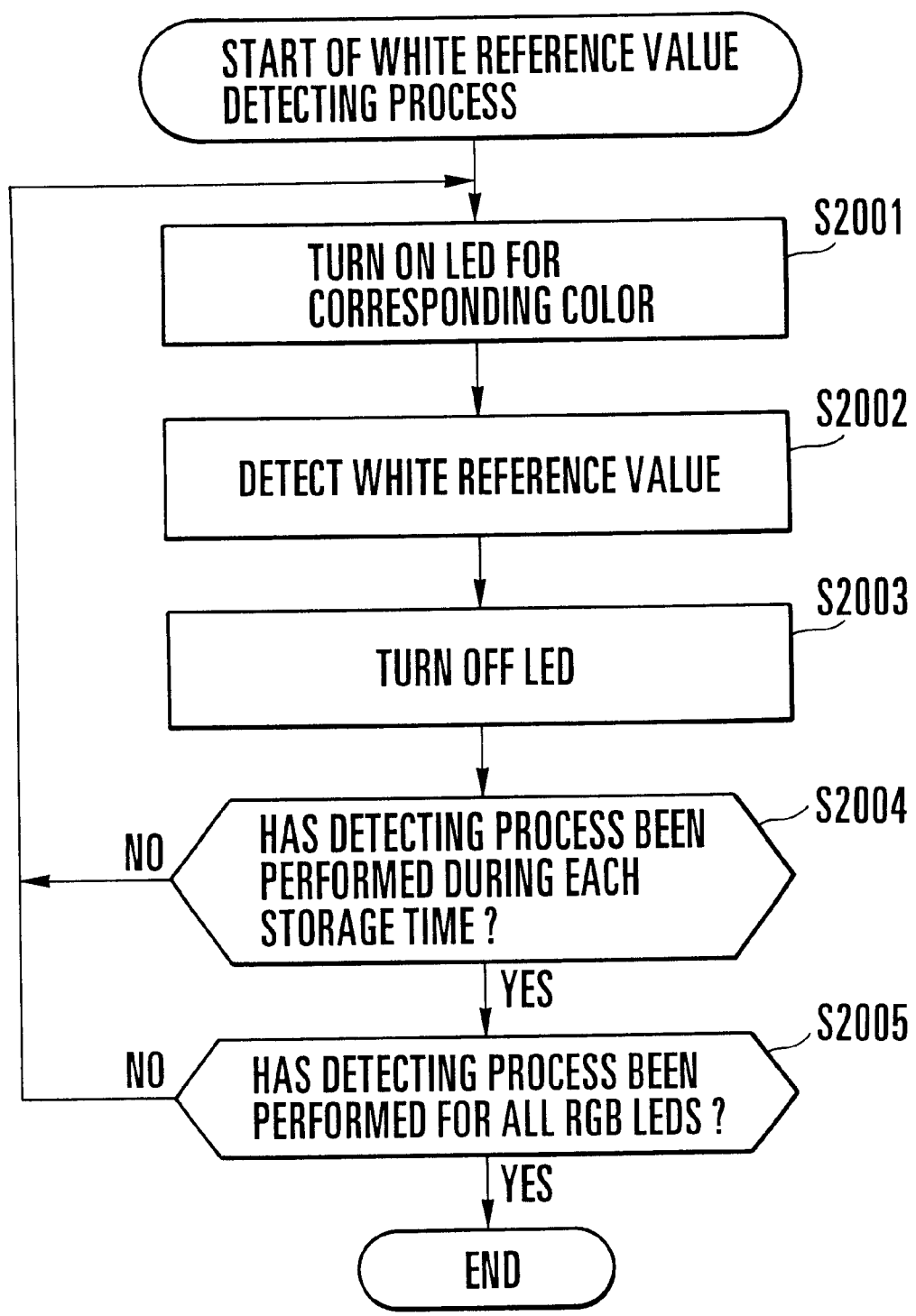
FIG. 22 is a flowchart showing the flow of a white reference value detecting process operation in the color scanner unit.

The second white reference value detecting process operation performed in Step S1705 of the flowchart shown in FIG. 19 will be described below with reference to the flowchart shown in FIG. 22. If the white reference value detecting process operation is started, an LED for a required color is turned on in Step S2001. Then, in Step S2002, the processing of detecting a white reference value is performed. Then, in Step S2003, the LED for the required color is turned off, and in the next step S2004, it is determined whether the white reference value detecting process has been performed in a storage time selected from among the four kinds of storage time. If this process has not yet been performed in the selected storage time, the process returns to Step S2001, in which the LED for the required color is turned on.

On the other hand, if it is determined in Step S2004 that the white reference value detecting process has been performed in the selected storage time, the process proceeds to Step S2005, in which it is determined whether the white reference value detecting process has been performed on all the R, G and B LEDs. If such detecting process has not yet been performed on all the R. G and B LEDS, the process returns to Step S2001, in which the LED for the required color is turned on. If such detecting process has been performed on all the R, G and B LEDS, the white reference value detecting process operation is completed.

Figure 23:
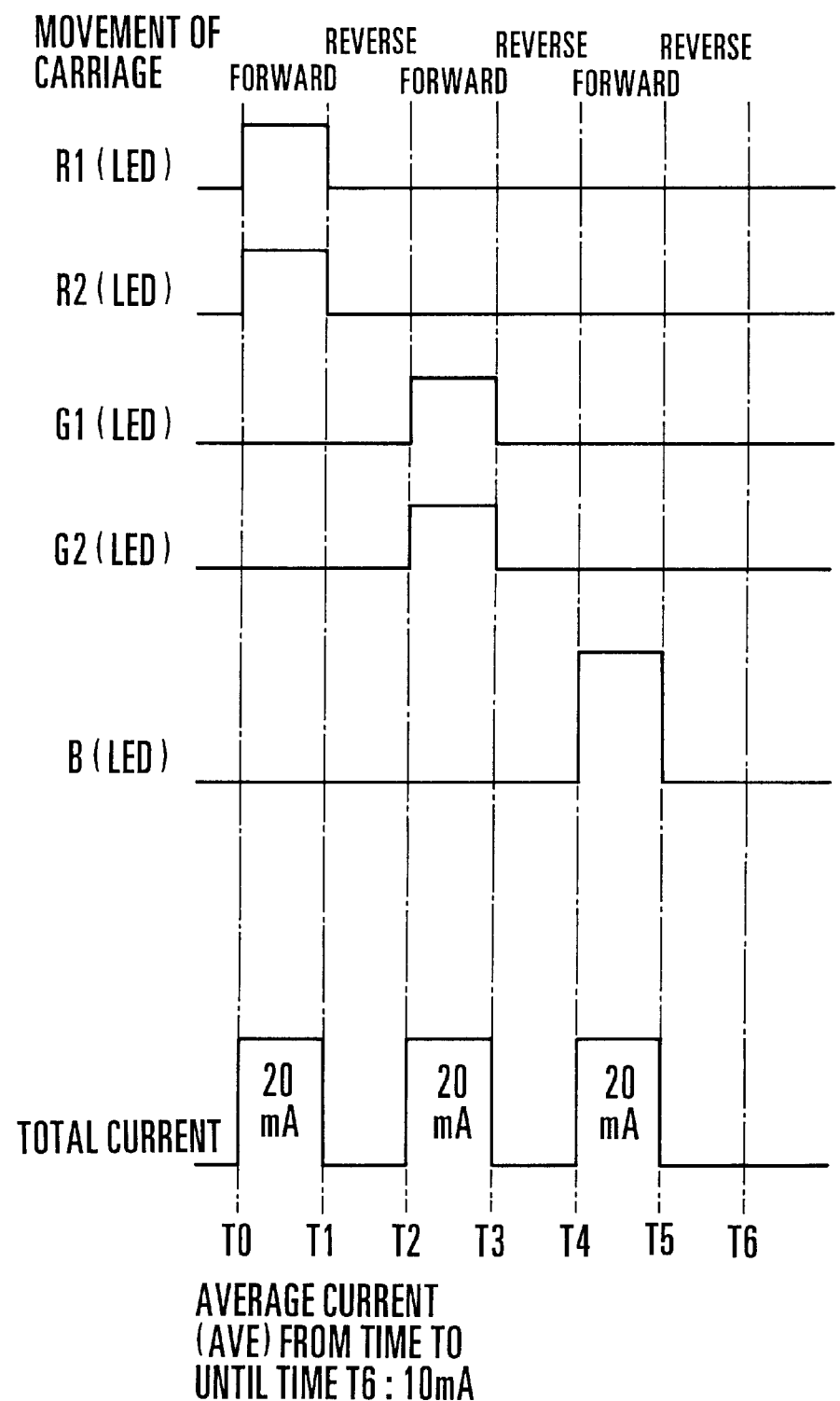
FIG. 23 is a timing chart showing current values during an image reading process in the color scanner unit.

FIG. 23 is a timing chart showing the values of currents which flow through the respective LEDs during an image reading process. As shown in FIG. 23, during the forward movement of the carriage, the red, green and blue LEDs (R1, R2, G1, G2 and,B) are sequentially turned on for each color, whereas during the reverse movement of the carriage, all of the red, green and blue LEDs (R1, R2, G1, G2 and B) are turned off. A total current consumed for each of time periods T0–T1, T2–T3 and T4–T5 is 20 mA, and an average current consumed for a time period T0–T6 is 10 mA. This control is similarly performed during the above-described preheating and warmth retention control, and is also similarly performed on average energy.

Figure 24:
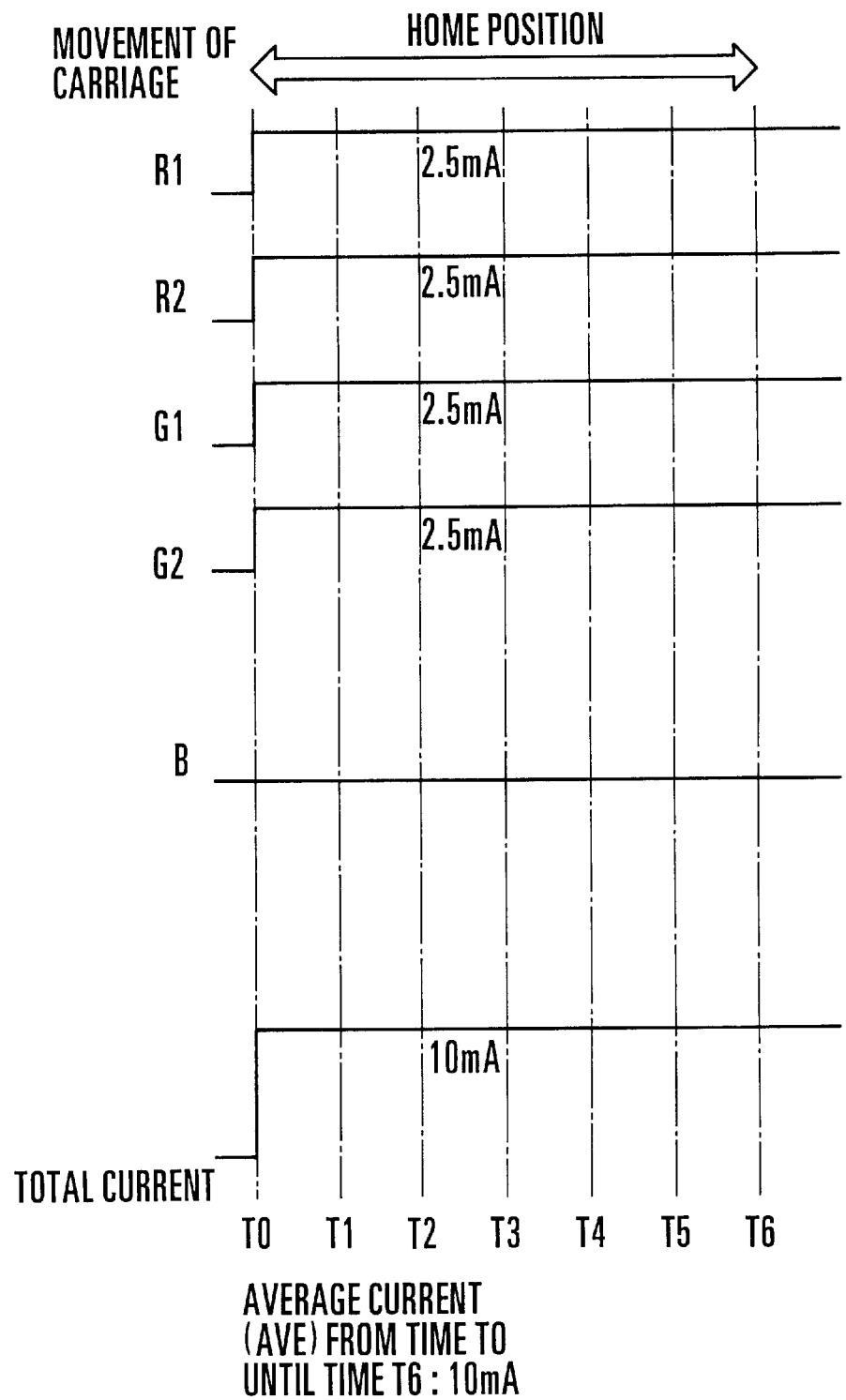
FIG. 24 is a timing chart showing current values during a warmth retention process in the color scanner unit.

FIG. 24 is a timing chart showing the values of currents which flow through the respective LEDs during warmth retention. As shown in FIG. 24, when the carriage is located at the home position, the value of current which flows through each of the LEDs (R1, R2, G1 and G2 excluding B) is 2.5 mA, i.e., 10 mA in total current, and an average current consumed for the time period T0–T6 is 10 mA.

Figure 25:
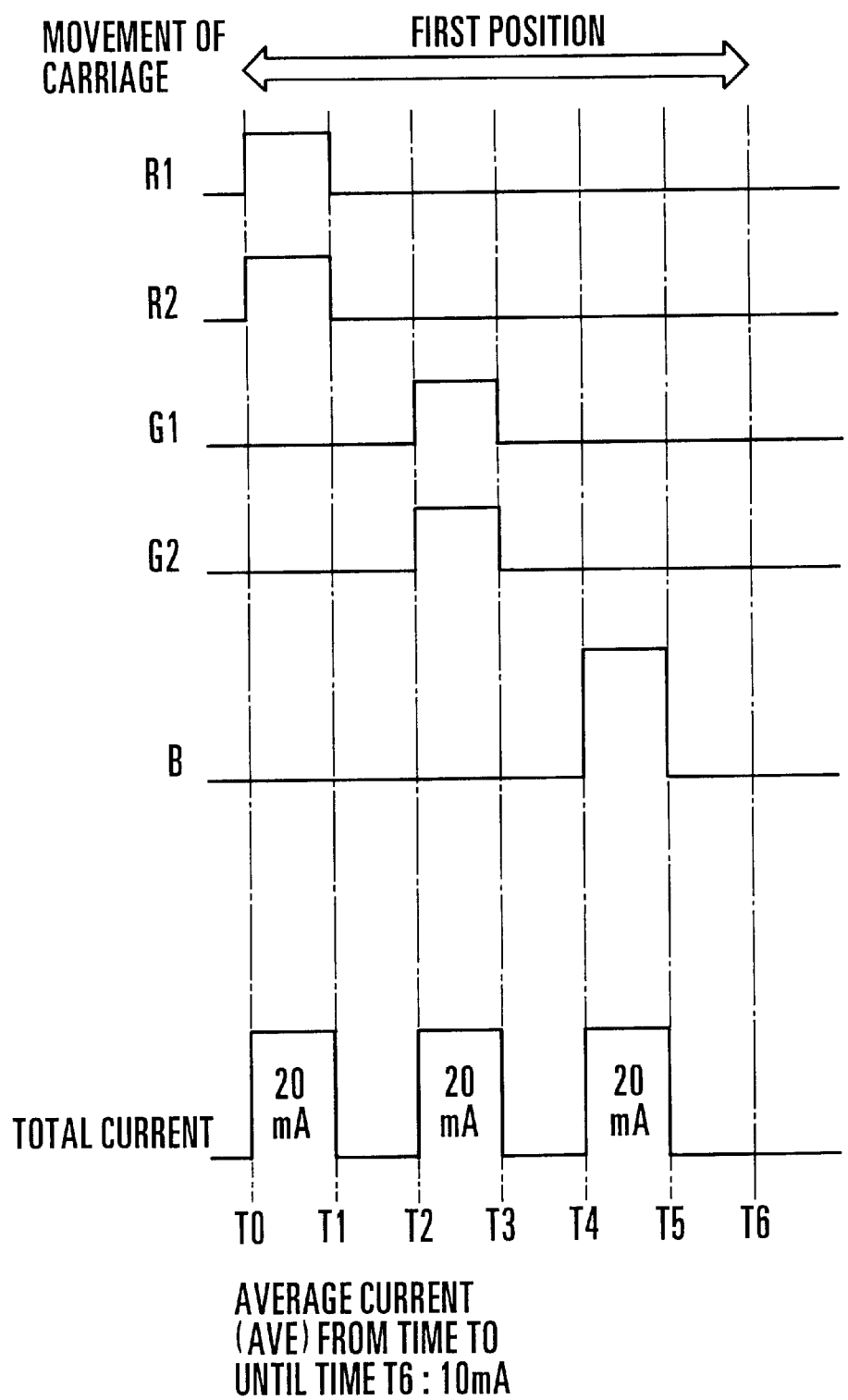
FIG. 25 is a timing chart showing current values during a gain value detecting process in the color scanner unit.

FIG. 25 is a timing chart showing the values of currents which flow through the respective LEDs during the gain value detecting process when the white reference value detecting process is started. As shown in FIG. 25, when the carriage is located at the home position, a total current consumed for each of the time periods T0–T1, T2–T3 and T4–T5 is 20 mA, and the average current consumed for the time period T0–T6 is 10 mA because all the LEDs (R1, R2, G1, G2 and B) are turned off for each of the time periods T1–T2, T3–T4 and T5–T6.

Figure 26:
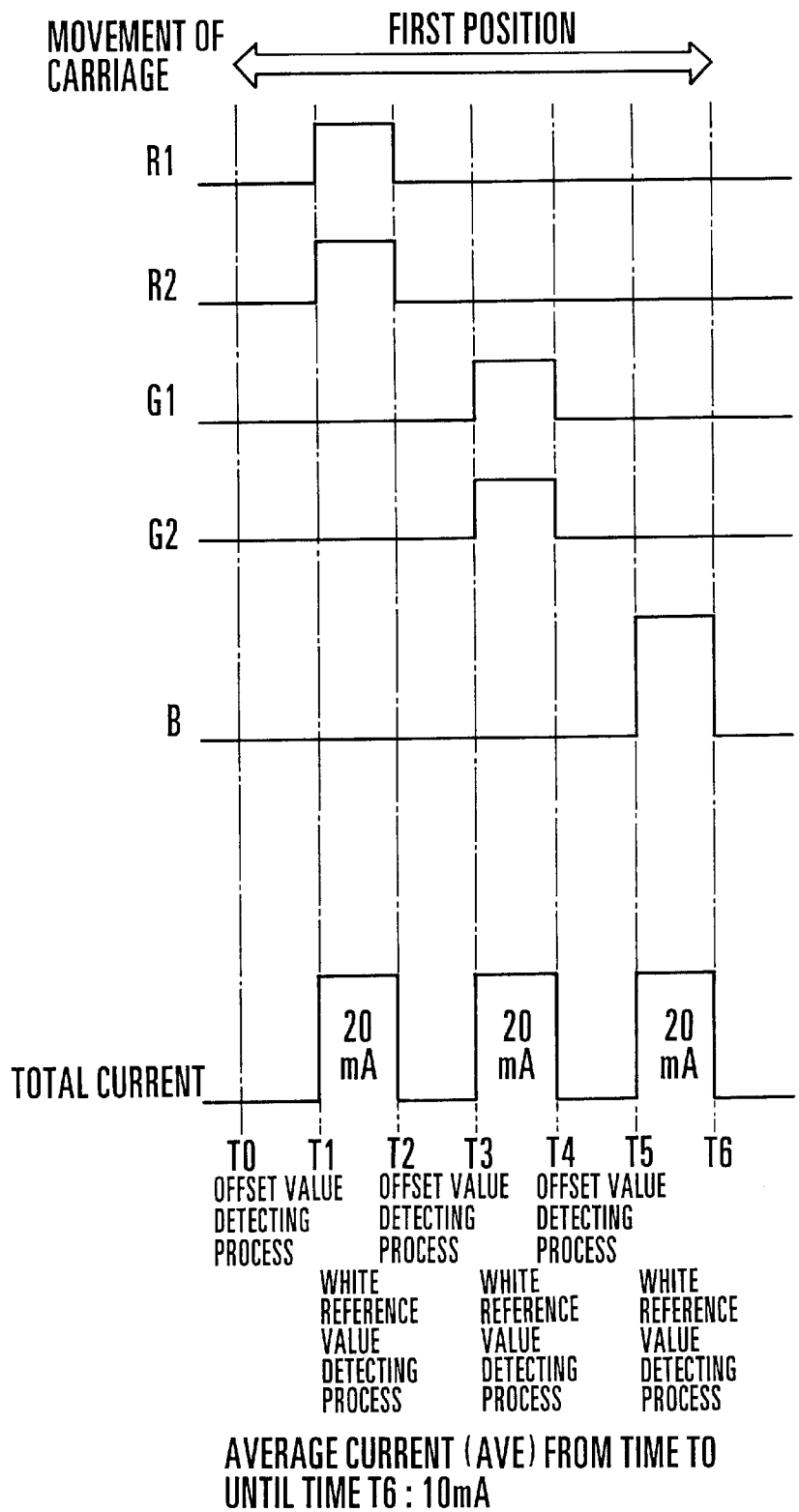
FIG. 26 is a timing chart showing current values during the offset value/white reference value detecting process in the color scanner unit.

FIG. 26 is a timing chart showing the values of currents which flow through the respective LEDs during the offset value/white reference value detecting process. As shown in FIG. 26, when the carriage is located at the first home position, a total current consumed for each of the time periods T1–T2, T3–T4 and T5–T6 is 20 mA, and the average current consumed for the time period T0–T6 is 10 mA because the time period allocated for the offset value detecting process and the time period allocated for the white reference value detecting process are made equal.

Figure 27:
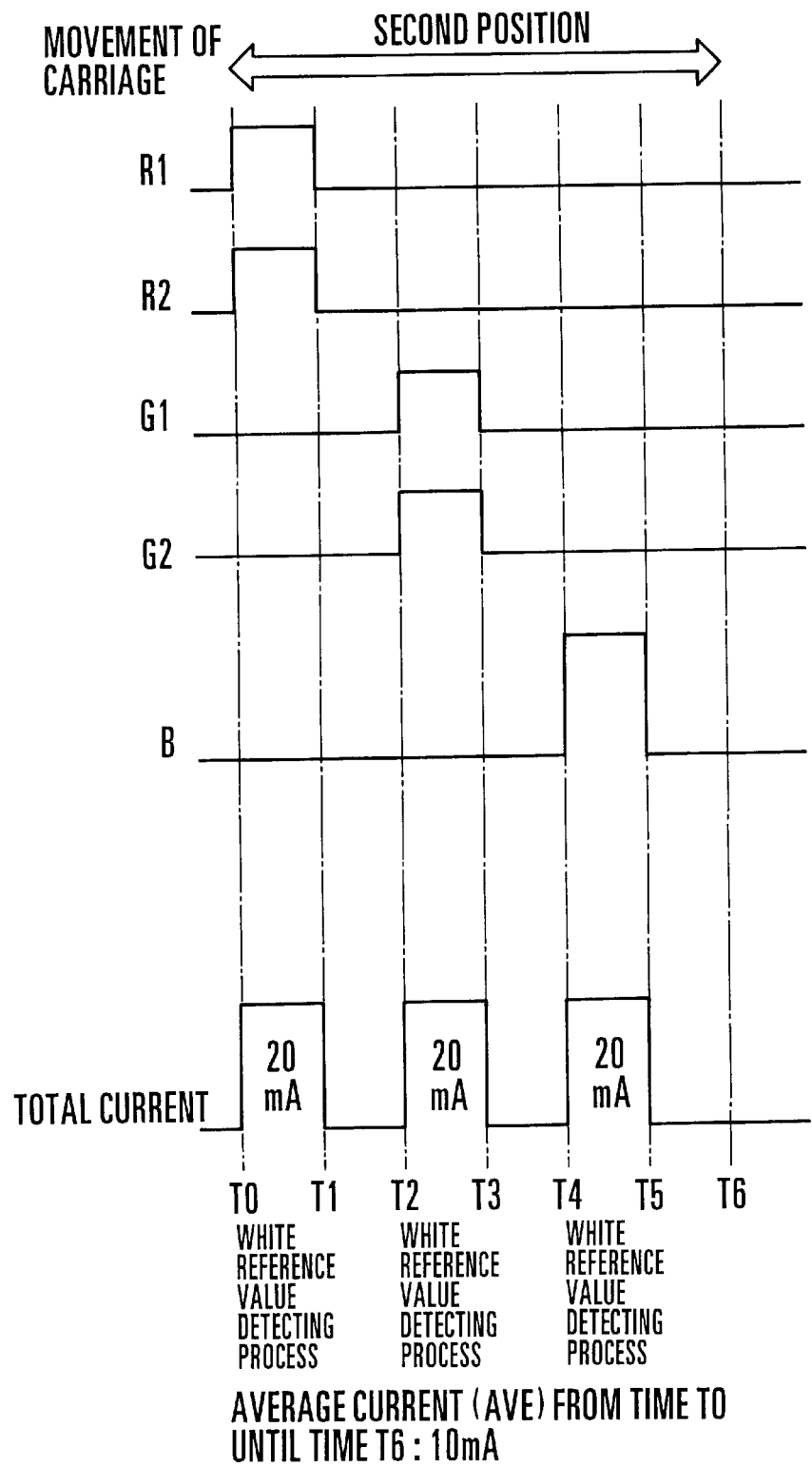
FIG. 27 is a timing chart showing current values during a white reference value detecting process in the color scanner unit.

FIG. 27 is a timing chart showing the values of currents which flow through the respective LEDs during the second white reference value detecting process. As shown in FIG. 27, when the carriage is located at the second home position, the total current consumed for each of the time periods T1–T2, T3–T4 and T5–T6 is 20 mA, and the average current consumed for the time period T0–T6 is 10 mA because a pause time period equal to the time period allocated for the white reference value detecting process is provided.

Figure 28:
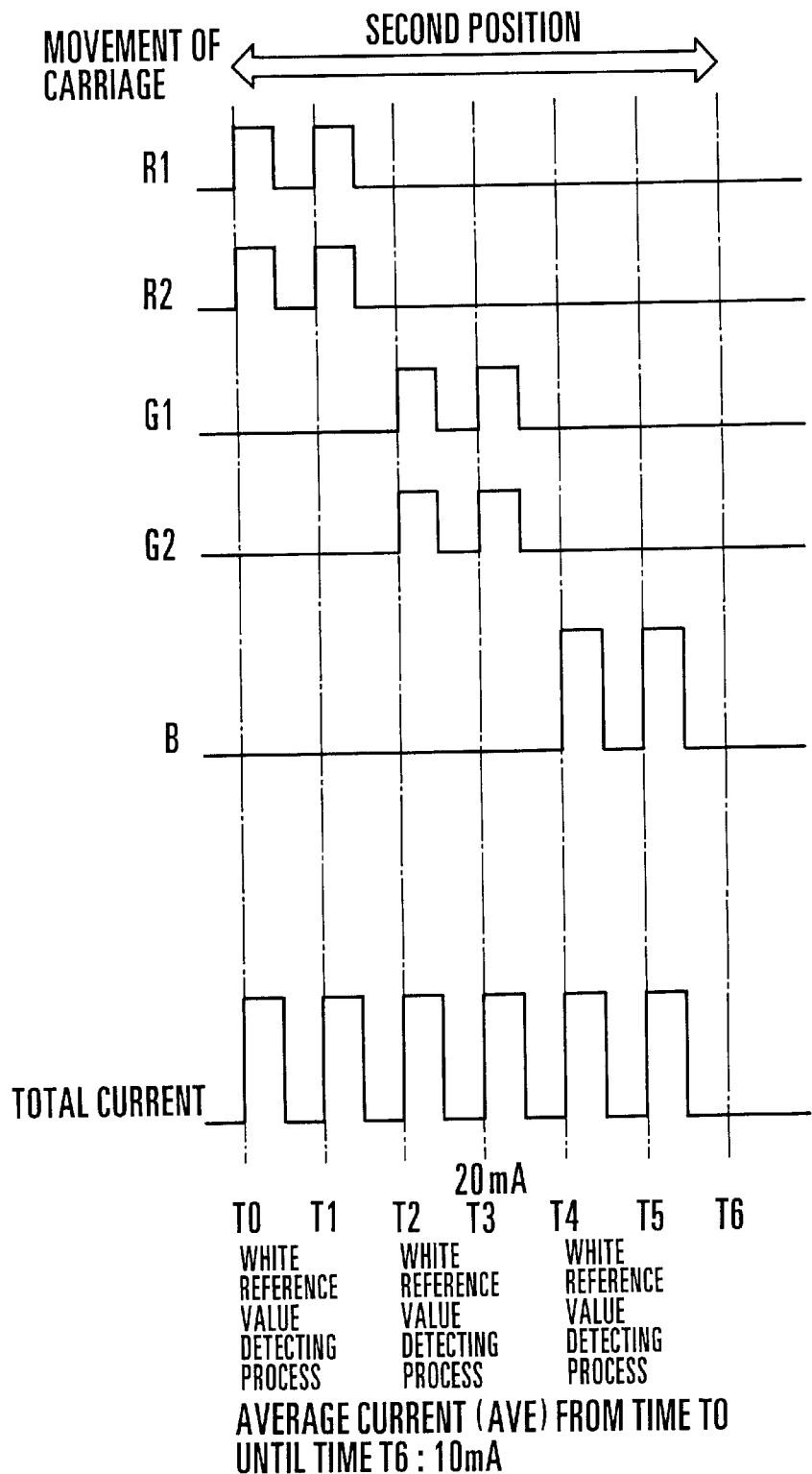
FIG. 28 is a timing chart showing current values during a second white reference value detecting process in the color scanner unit.

FIG. 28 is a timing chart showing the values of currents which flow in the respective LEDs during the white reference value detecting process based on a method different from that shown in FIG. 27. As shown in FIG. 28, the LEDs (R1, R2, G1, G2 and B) are sequentially blinked during each white reference value detecting process, and the average current consumed for the time period T0–T6 is 10 mA. In this case, the total current consumed for the time period T0–T6 is 20 mA.

By executing the above-described processes, energy which is equal in amount to that consumed during preheating, warmth retention or reading is consumed during a white reference data obtaining process, whereby a stable white reference value can be obtained.

(Second Embodiment)

A second embodiment of the present invention will be described below with reference to FIGS. 29 and 30. Since the basic construction of an image reading device according to the second embodiment is similar to that of the image reading device according to the above-described first embodiment, the following description will again refer to, as required, the drawings which have been mentioned above in the description of the first embodiment.

In the above-described first embodiment, since the output variations of the LEDs are influenced by environmental temperature, this influence is reduced by temperature management and correction control. In the second embodiment, since the output variations of the LEDs are influenced by the self-heating temperature of a light source, this influence is reduced by temperature management and correction control.

In the second embodiment, the driving conditions of the respective color LEDs during reading are as follows:

[$R$(strong driving, 100%=$Ir$), $G$(strong driving, 100%=$Ig$), $B$(strong driving, 100%=$Ib$)].

In the second embodiment, warmth retention control can be performed under the following warmth retention condition:

warmth retention=$R$(weak driving, 100%=$Ihr$)+$G$(weak driving, 100%=$Ihg$).

Figure 29:
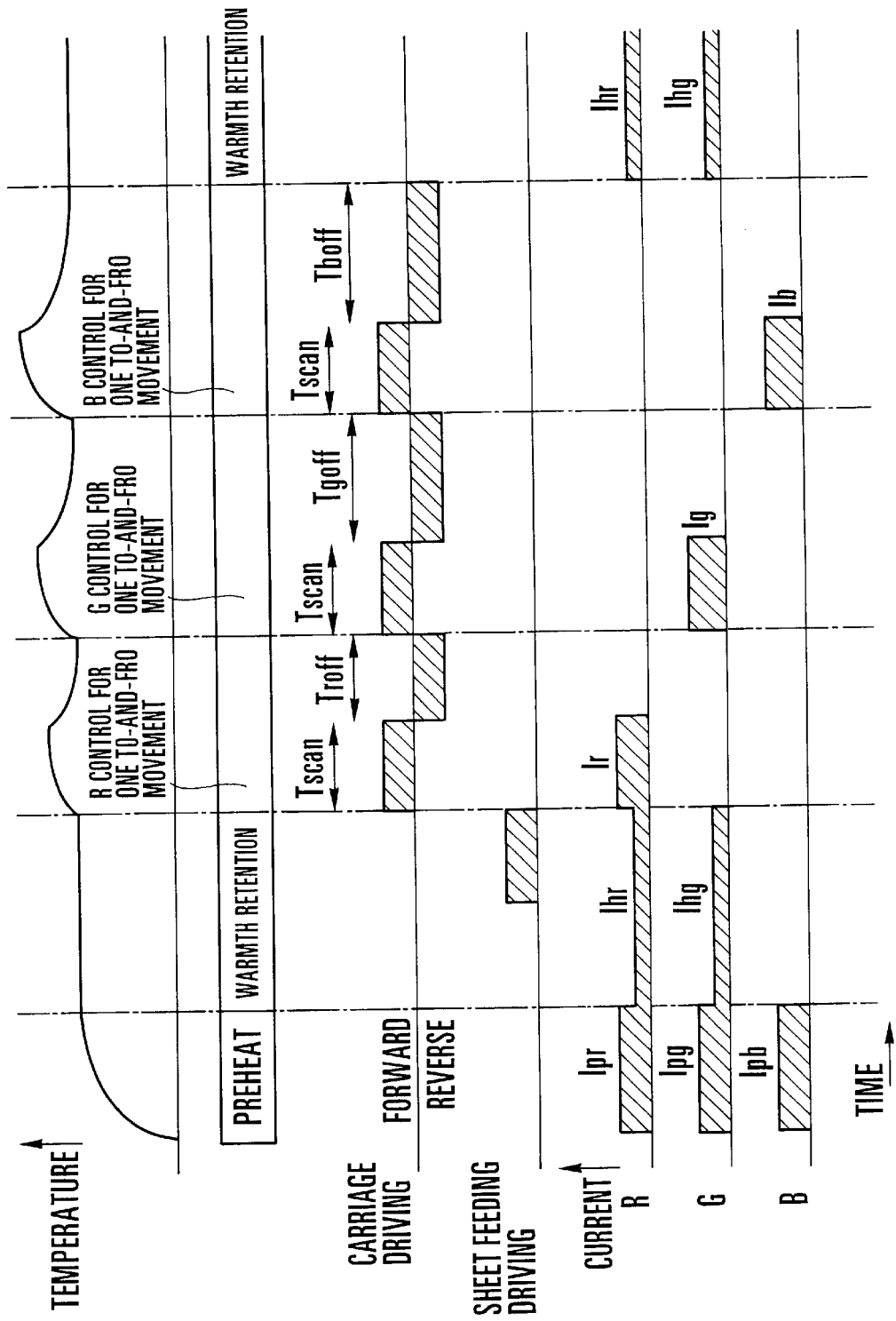
FIG. 29 is a diagram showing the control concept of a color scanner unit which is an image reading device according to a second embodiment of the present invention.

FIG. 29 is a view showing the outline of control for equilibrating heat during one to-and-fro movement of the carriage, and collectively shows the current driving conditions of the respective LEDs, the state of temperature, and the state of driving of the carriage.

The operation of the image reading device according to the second embodiment will be described below with reference to FIGS. 29 and 30. FIG. 30 is a flowchart showing how LED current driving control is performed on the basis of heat equilibrating control during one to-and-fro movement of the carriage in a one-page scan process of the image reading device according to the second embodiment. Incidentally, preheat control and warmth retention control are performed previous to the process shown in FIG. 30.

Figure 30:
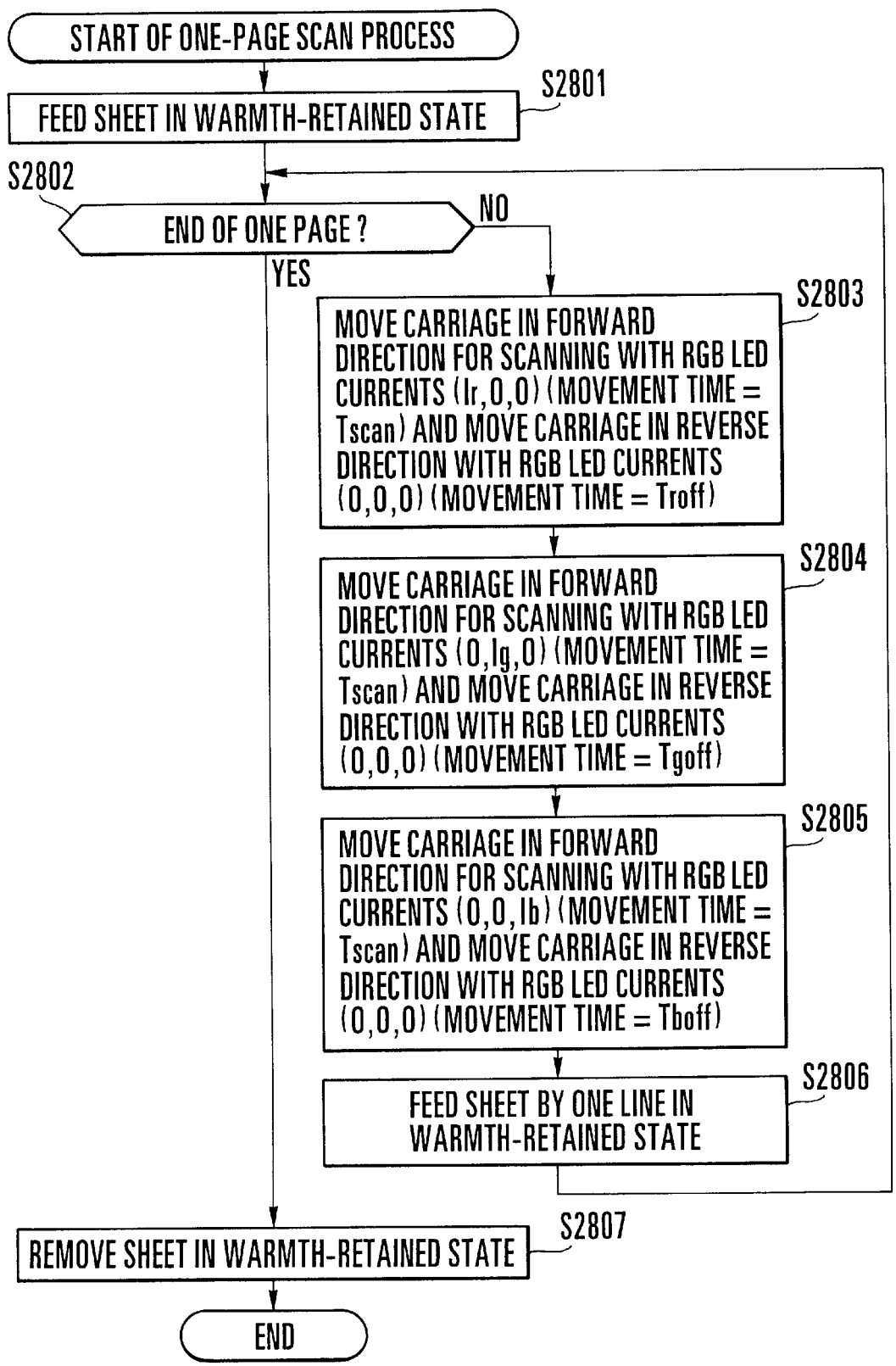
FIG. 30 is a flowchart showing the flow of the scan process operation of the color scanner unit.

In the flowchart shown in FIG. 30, if the one-page scan process is started, a sheet of an original is fed in a warmth-retained state in Step S2801, and in the next step S2802, it is determined whether the one-page scan process has been completed. If the one-page scan process has been completed, the process proceeds to Step S2807, in which the sheet of the original is discharged in a warmth-retained state, and then this process is completed.

On the other hand, if it is determined in Step S2802 that the one-page scan process has not yet been completed, the process proceeds to Step S2803, in which control for R scan is performed during one to-and-fro movement of the carriage as shown in FIG. 29, i.e., a scan (of movement time period Tscan) is performed with current Ir during the forward movement of the carriage, and then during the reverse movement of the carriage, all the LEDs are turned off and the carriage is controlled to return in a time period Troff required to radiate the heat accumulated for the time period Tscan during the forward movement. Then, in Step S2804, control for G scan is performed during another to-and-fro movement of the carriage as shown in FIG. 29, i.e., a scan (of movement time period Tscan) is performed with current Ig during the forward movement of the carriage, and then during the reverse movement of the carriage, all the LEDs are turned off and the carriage is controlled to return in a time period Tgoff required to radiate the heat accumulated for the time period Tscan during the forward movement. Then, in Step S2805, control for B scan is performed during another to-and-fro movement of the carriage as shown in FIG. 29, i.e., a scan (of movement time period Tscan) is performed with current Ib during the forward movement of the carriage, and then during the reverse movement of the carriage, all the LEDs are turned off and the carriage is controlled to return in a time period Tboff required to radiate the heat accumulated for the time period Tscan during the forward movement.

Since the R, G and B LEDs differ from one another in current, characteristic and construction, even if their storage times are the same and their movement time periods Tscan are the same, the extent of heat accumulation greatly differs among the R, G and B LEDs as shown in FIG. 29. Accordingly, the time periods required for the respective R, G and B LEDs to radiate their accumulated heat are Tboff>Tgoff>Troff.

When an RGB color scan process for one line is completed through the above-described steps S2803 to S2805, the sheet of the original is fed by one line in a warmth-retained state in Step S2806, and the process returns to Step S2802, in which it is determined whether the one-page scan process has been completed.

The above-described operation is repeatedly performed up to the last page.

The above-described control for R scan during one to-and-fro movement of the carriage, control for G scan during one to-and-fro movement of the carriage, and control for B scan during one to-and-fro movement of the carriage are performed so that in each of the controls, heat equilibrium can be completely held and so that a heat equilibration point during preheating and that during warmth retention can be made the same.

By using these controls, it is possible to stably obtain an image with high quality so long as environmental conditions do not greatly change.

(Third Embodiment)

A third embodiment of the present invention will be described below with reference to FIGS. 31 and 32. Since the basic construction of an image reading device according to the third embodiment is similar to that of the image reading device according to the above-described first embodiment, the following description will again refer to, as required, the drawings which have been mentioned above in the description of the first embodiment.

The third embodiment differs from the above-described second embodiment in that a scan time period for the control for each RGB scan during one to-and-fro movement of the carriage is made variable by varying the storage time for each RGB scan, and in that heat equilibration is effected in such a manner that the time period required for the carriage to return is made equal to the time period required for the forward movement of the carriage.

Figure 31:
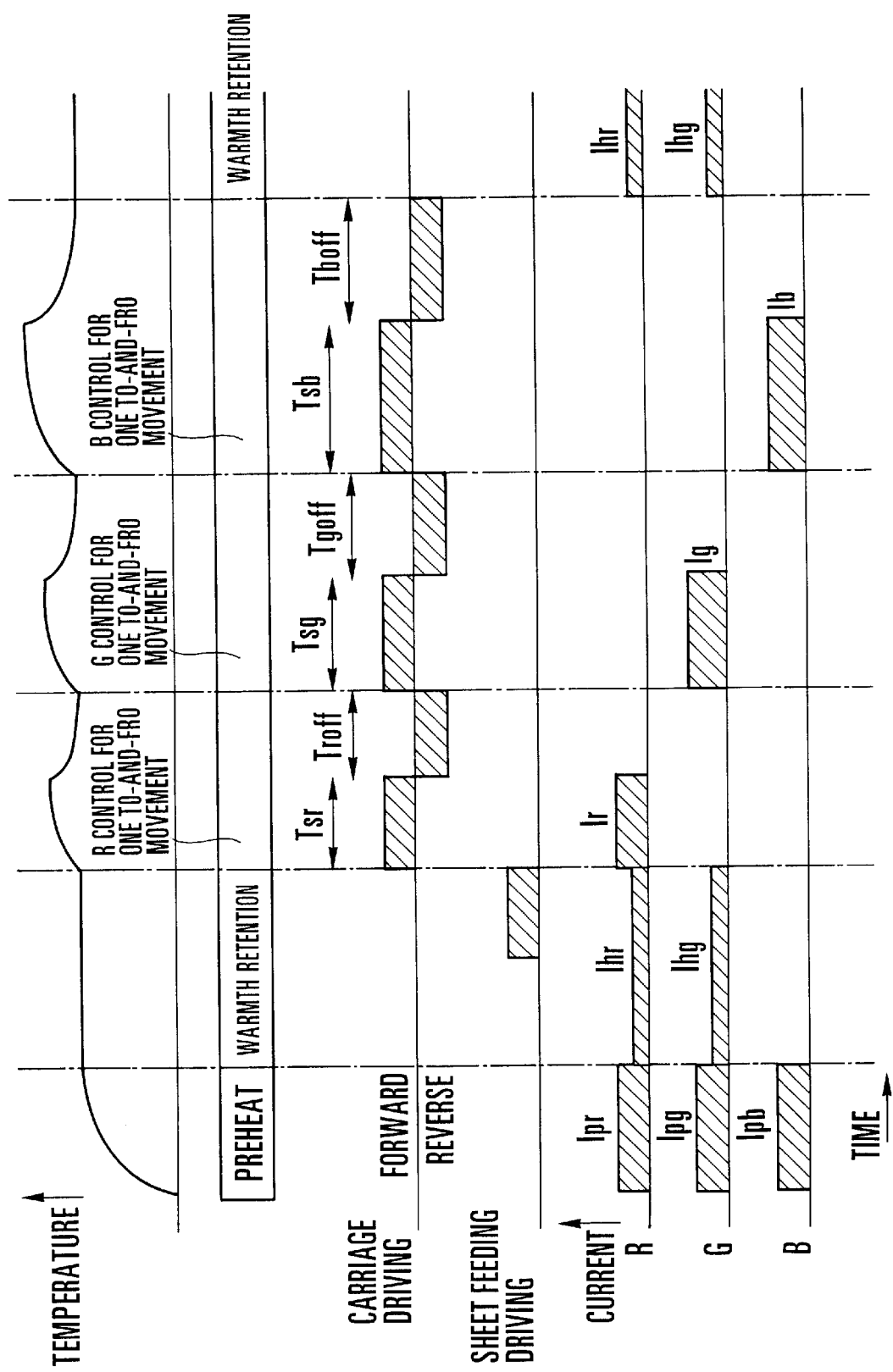
FIG. 31 is a flowchart showing the control concept of a color scanner unit which is an image reading device according to a third embodiment of the present invention.

FIG. 31 is a view showing the outline of control for equilibrating heat during one to-and-fro movement of the carriage, and collectively shows the current driving conditions of the respective LEDs, the state of temperature, and the state of driving of the carriage. FIG. 32 is a flowchart showing how LED current driving control is performed on the basis of heat equilibrating control during one to-and-fro movement of the carriage in a one-page scan process of the image reading device according to the third embodiment. Incidentally, preheat control and warmth retention control are performed previous to the process shown in FIG. 32.

Figure 32:
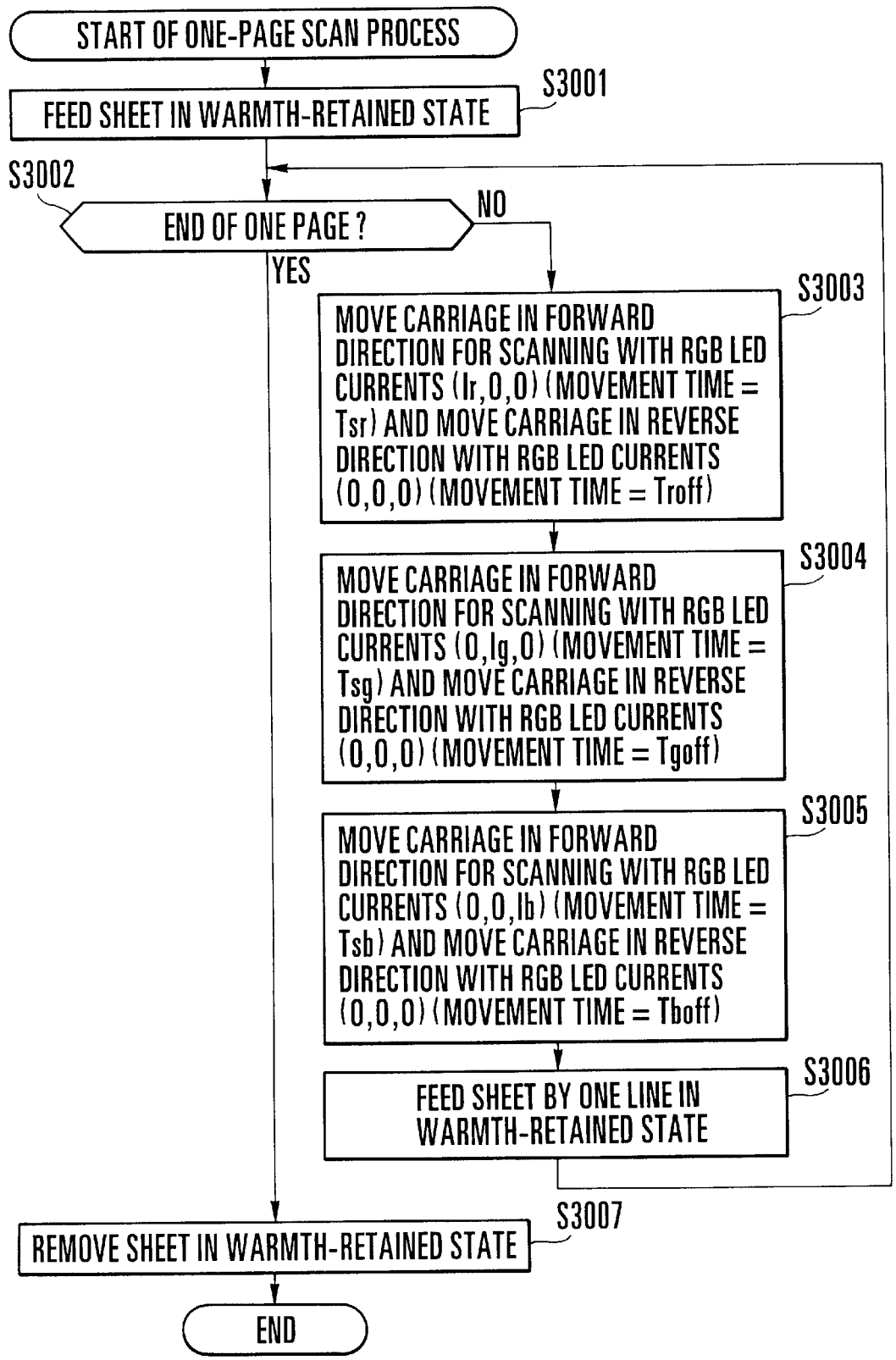
FIG. 32 is a flowchart showing the flow of the scan process operation of the color scanner unit.
Figure 33:
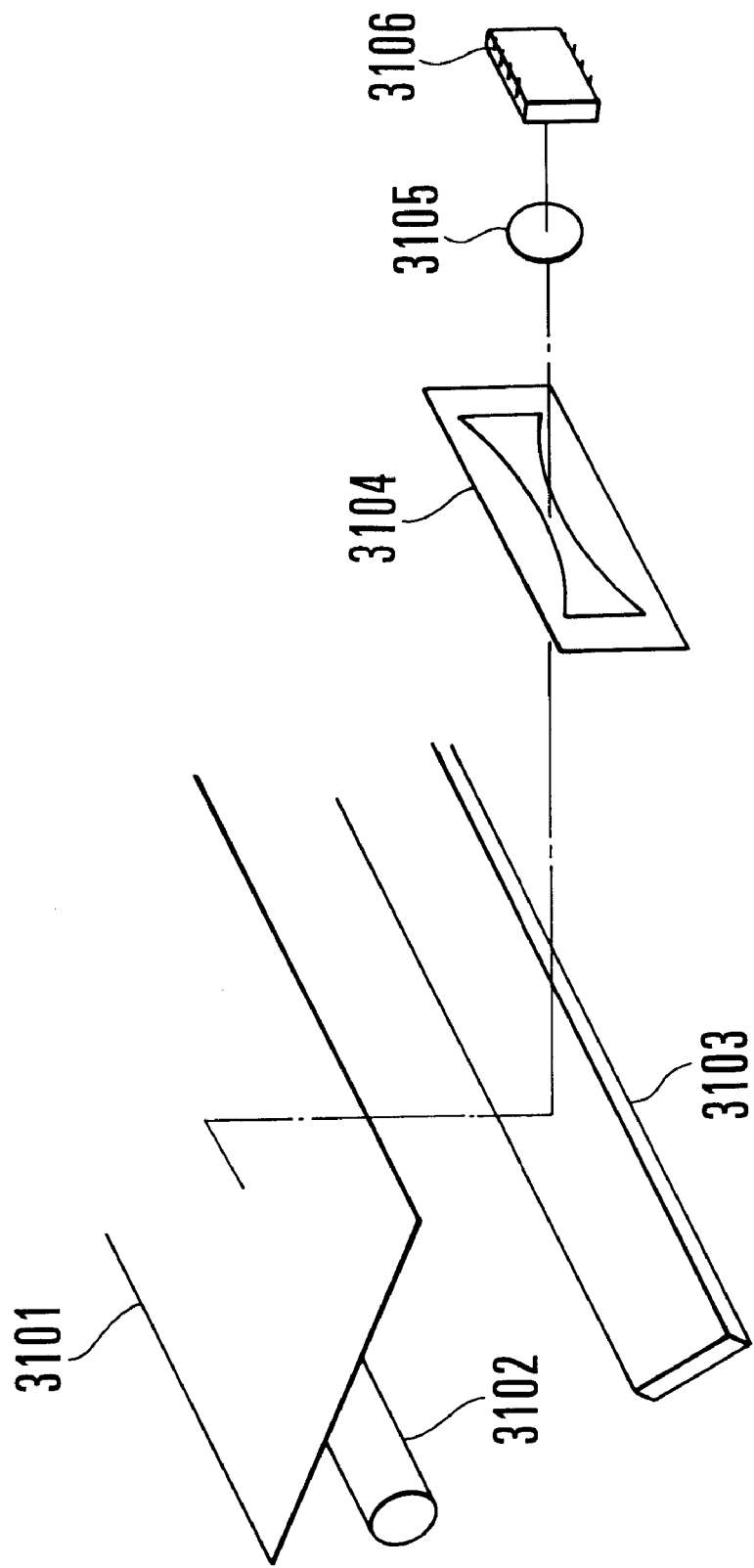
FIG. 33 is a view showing the principle and the construction of an image reading device.

In the flowchart shown in FIG. 32, if the one-page scan process is started, a sheet of an original is fed in a warmth-retained state in Step S3001, and in the next step S3002, it is determined whether the one-page scan process has been completed. If the one-page scan process has been completed, the process proceeds to Step S3007, in which the sheet of the original is discharged in a warmth-retained state, and then this process is completed.

On the other hand, if it is determined in Step S3002 that the one-page scan process has not yet been completed, the process proceeds to Step S3003, in which control for R scan is performed during one to-and-fro movement of the carriage as shown in FIG. 31, i.e., a scan (of movement time period Tsr) is performed with the current Ir during the forward movement of the carriage, and then during the reverse movement of the carriage, all the LEDs are turned off and the carriage is controlled to return in the time period Troff required to radiate the heat accumulated for the movement time period Tsr during the forward movement. Then, in Step S3004, control for G scan is performed during another to-and-fro movement of the carriage as shown in FIG. 31, i.e., a scan (of movement time period Tsg) is performed with the current Ig during the forward movement of the carriage, and then during the reverse movement of the carriage, all the LEDS are turned off and the carriage is controlled to return in the time period Tgoff required to radiate the heat accumulated for the movement time period Tsg during the forward movement. Then, in Step S3005, control for B scan is performed during another to-and-fro movement of the carriage as shown in FIG. 31, i.e., a scan (of movement time period Tsb) is performed with the current Ib during the forward movement of the carriage, and then during the reverse movement of the carriage, all the LEDs are turned off and the carriage is controlled to return in the time period Tboff required to radiate the heat accumulated for the movement time period Tsb during the forward movement.

Since the R, G and B LEDs differ from one another in current, characteristic and construction, even if their storage times differ and their movement time periods Tsr, Tsg and Tsb also differ, the extent of heat accumulation greatly differs among the R, G and B LEDS as shown in FIG. 31. Accordingly, the time periods required for the respective R, G and B LEDs to radiate their accumulated heat are Tboff>Tgoff>Troff.

When an RGB color scan process for one line is completed through the above-described steps S3003 to S3005, the sheet of the original is fed by one line in a warmth-retained state in Step S3006, and the process returns to Step S3002, in which it is determined whether the one-page scan process has been completed.

The above-described operation is repeatedly performed up to the last page.

As described hereinabove in detail, under circuit conditions determined by dimensional limitations on a circuit whose construction needs to be simplified and whose power consumption needs to be reduced, for installation in the interior of a notebook-sized personal computer, it is possible to achieve the advantage of obtaining a stable white reference value and reading a high-quality image without being affected by a variation in environmental temperature.

It is also possible to achieve the advantage of obtaining a stable white reference value and reading a high-quality image without being affected by the self-heating of a light source for illuminating an original, by means of simple control without the need for an additional circuit.

We claim:

1. An image reading device which reads an original image illuminated by a plurality of light sources by using a light-receiving element, comprising a control circuit which controls to supply a first average power which is substantially equal to a second average power; said first average power is supplied to said plurality of light sources during a period until a read-start signal for reading out the original image is received after the reference data has been received, and second average power is supplied to said plurality of light sources during obtaining reference data which serves as a reference for correcting an image signal outputted from said light-receiving element, wherein a power supplied to a predetermined light source during said period until a read-start signal for reading out the original image is received after the reference data has been received is smaller than a power supplied to said predetermined light source during obtaining said reference data.

2. An image reading device according to claim 1, wherein said control circuit controls the power supplied to said plurality of light sources by varying a lighting duty of said plurality of light sources.

3. An image reading device according to claim 1, wherein said control circuit controls the power supplied to said plurality of light sources so that the power which is supplied to said plurality of light sources in the process of obtaining the reference data is made approximately the same as power which is supplied to said plurality of light sources when an image is being read by said light-receiving element.

4. An image reading device according to claim 3, wherein said control circuit controls the power supplied to said plurality of light sources by varying a lighting duty of said plurality of light sources.

5. An image reading device according to claim 1, wherein said light-receiving element is a CCD.

6. An image reading device according to claim 1, wherein said light sources are illuminated by supplying said power thereto.

7. An image reading device according to claim 1, wherein said power supplied to the predetermined one among the plurality of light sources during obtaining the reference data is supplied intermittently, and said power supplied to the predetermined light source during a period until a read-start signal for reading out the original image is received after the reference data has been obtained is supplied continuously.

8. An image reading device according to claim 1, wherein said plurality of light sources emit at least two light fluxes which are different in emission wavelength to each other.

9. A method of controlling an image reading device which reads an original image illuminated by a plurality of light sources, by using a light-receiving element, comprising a step of controlling to supply a first average power which is substantially equal to a second average power; said first average power is supplied to said plurality of light sources during a period until a read-start signal for reading out the original image is received after the reference data has been received, and said second average power is supplied to the plurality of light sources during obtaining reference data which serves as a reference for correcting an image signal outputted from said light-receiving element, wherein a power supplied to a predetermined light source during said period until a read-start signal for reading out the original image is received after the reference data has been received is smaller than a power supplied to said predetermined light source during obtaining said reference data.

10. A method according to claim 9, wherein the power supplied to said plurality of light sources is controlled by varying a lighting duty of said plurality of light sources.

11. A method according to claim 9, wherein the power supplied to said plurality of light sources is controlled so that the power which is supplied to said plurality of light sources in the process of obtaining the reference data is made approximately the same as power which is supplied to said plurality of light sources when an image is being read by the light-receiving element.

12. A method according to claim 11, wherein the power supplied to said plurality of light sources is controlled by varying a lighting duty of said plurality of light sources.

13. A method according to claim 9, wherein said light sources are illuminated by supplying power thereto.

14. A method according to claim 9, wherein said power supplied to the predetermined one among the plurality of light sources during obtaining the reference data is supplied intermittently, and said power supplied to the predetermined light source during a period until a reading start signal for reading out the original image is received after the reference data has been obtained is supplied continuously.

15. A method according to claim 9, wherein a plurality of light sources emit at least two light fluxes which are different in emission wavelength to each other.

16. An image reading device which reads an image illuminated by a plurality of light sources, comprising a non-reading mode which controls more light sources to be driven than during an image reading process, wherein a level of a driving signal per light source during said non-reading mode is made lower than that during said image reading process.

17. An image reading device according to claim 16, further comprising:

a reading mode for supplying a predetermined driving signal to a predetermined number of light sources; and a non-reading mode for supplying a driving signal to more light sources than those under said reading mode, wherein a level of a driving signal per light source is made lower than that during an image reading process.

18. An image reading device according to claim 16, wherein said light sources illuminate in response to said driving signal.

19. An image reading device according to claim 16, wherein said plurality of light sources emit at least two light fluxes which are different in emission wavelength to each other.

20. An image reading device according to claim 16, wherein the driving signal is controlled by varying a duty of the power supplied to said light sources.

21. A method of controlling an image reading device having a plurality of light sources, wherein it controls more light sources in a non-reading mode than during an image reading process, wherein a level of a driving signal per light source during said non-reading mode is made lower than that during said image reading process.

22. A method according to claim 21, further comprising:

supplying a predetermined driving signal to a predetermined number of light sources in a reading mode; and supplying a driving signal to more light sources in a non-reading mode than those under said reading mode, wherein a level of a driving signal per light source is made lower than that during an image reading process.

23. A method according to claim 21, wherein said light sources illuminate in response to said driving signal.

24. A method according to claim 21, wherein said plurality of light sources emit at least two light fluxes which are different in emission wavelength to each other.

25. A method according to claim 21, wherein the driving signal is controlled by varying a duty of the power supplied to said light sources.

* * * * *

UNITED STATES PATENT AND TRADEMARK OFFICE
CERTIFICATE OF CORRECTION

PATENT NO. : 6,356,365 B1
DATED : March 12, 2002
INVENTOR(S) : Jun Oida et al.

It is certified that error appears in the above-identified patent and that said Letters Patent is hereby corrected as shown below:

Column 11,
Line 15, delete "LEDS" and insert -- LEDs --.
Line 17, delete "LEDS" and insert -- LEDs --.

Column 12,
Line 3, delete "LEDS" and insert -- LEDs --.
Line 6, delete "LEDS" and insert -- LEDs --.

Column 15,
Line 40, delete "LEDS" and insert -- LEDs --.

Signed and Sealed this

Third day of September, 2002

Attest:

JAMES E. ROGAN
Attesting Officer    Director of the United States Patent and Trademark Office